US006792486B1

(12) United States Patent
Hanan et al.

(10) Patent No.: US 6,792,486 B1
(45) Date of Patent: Sep. 14, 2004

(54) SYSTEM AND METHOD FOR MANAGING INFORMATION STORAGE AMONG PLURAL DISK DRIVES

(75) Inventors: Thomas D. Hanan, Mission Viejo, CA (US); Marc B. Goldstone, Irvine, CA (US); Charles W. Frank, Jr., Irvine, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 160 days.

(21) Appl. No.: 10/137,237

(22) Filed: Apr. 30, 2002

(51) Int. Cl.[7] .............................................. G06F 13/14
(52) U.S. Cl. ............................. 710/74; 710/8; 710/13; 710/72; 711/111; 711/114
(58) Field of Search ............................... 710/8, 13, 72, 710/74; 711/100, 111, 114

(56) References Cited

U.S. PATENT DOCUMENTS

| 5,243,581 | A | * | 9/1993 | Yuji et al. .................. 369/30.2 |
| 5,603,062 | A | * | 2/1997 | Sato et al. ..................... 710/52 |
| 5,603,066 | A | | 2/1997 | Krakirian |
| 5,781,803 | A | | 7/1998 | Krakirian |
| 5,950,230 | A | | 9/1999 | Islam et al. |
| 6,343,324 | B1 | * | 1/2002 | Hubis et al. ................ 709/229 |
| 6,513,102 | B2 | * | 1/2003 | Garrett et al. .............. 711/165 |
| 6,542,961 | B1 | * | 4/2003 | Matsunami et al. ........ 711/114 |
| 6,647,458 | B1 | * | 11/2003 | Glynn ......................... 711/112 |

* cited by examiner

Primary Examiner—Rehana Perveen
(74) Attorney, Agent, or Firm—Milad G. Shara, Esq.; Burns Doane Swecker & Mathis

(57) ABSTRACT

A system and method are disclosed for managing information storage among plural disk drives. In accordance with exemplary embodiments of the present invention, the system includes plural host interfaces and first and second elements. The first and second elements each comprise a set of disk drives for storing information. Each of the first and second elements is associated with an element frame. Each disk drive included in the first element is connected to a different one of the plural host interfaces during the element frame of the first element. The system includes a switch controller, configurable by at least one of the plural host interfaces, for selecting among the first and second elements, and for directing information from a first one of the plural host interfaces to a selected disk drive within the first element. The system also includes a frame controller for controlling a duration of each element frame.

83 Claims, 9 Drawing Sheets

SYSTEM AND METHOD FOR MANAGING INFORMATION STORAGE AMONG PLURAL DISK DRIVES

BACKGROUND

1. Field of the Invention

The present invention relates generally to information storage systems. More particularly, the present invention relates to a system and method for managing information storage among plural disk drives.

2. Background Information

Computing systems store data within electronic storage devices such as hard disk drives. The storage capacity of these storage devices has rapidly increased as the demands for storage made by modem computing systems have increased. With the increase in capacity, there has been a concurrent increase in the performance of these storage devices as the processing speed and power of modem computing systems have improved. Many users, such as the high-end enterprise market, have become highly dependent on these high performance, high capacity storage devices. However, along with the high performance and high capacity offered by these disk drives, a need for increased reliability of such storage subsystems has also developed.

Disk array storage systems provide both improved capacity and performance, as compared to single disk devices. In a disk array storage system, multiple disk drives are used in a cooperative manner to perform, in parallel, the tasks normally performed by a single disk drive. In such a disk array storage system, data is stored in a distributed manner throughout the disk drives for parallel, high-speed access. For example, striping techniques are often used to spread large amounts of information over the multiple disk drives in the disk array storage system. However, adding multiple disk drives to a storage system reduces the reliability of the overall storage system. In particular, spreading data over multiple disk drives in a disk array increases the potential for system failure. Failure of any of the multiple disk drives translates to failure of the storage system, because the data stored on the disk drives cannot be correctly retrieved.

RAID (Redundant Array of Inexpensive Disks, also known as Redundant Array of Independent Disks) techniques are commonly used to improve reliability in disk array storage systems. There are seven "levels" of standard RAID geometries. RAID level 0 provides disk-striping capabilities for improved performance, but without an accompanying increase in reliability. There are six other RAID levels (RAID levels 1–6) that configure multiple disk drives in the disk array in geometries that permit redundancy of stored data to assure data integrity in case of various failures. The fundamental concepts of RAID technology are discussed in, for example, U.S. Pat. No. 5,950,230, the disclosure of which is hereby incorporated by reference in its entirety.

In a RAID storage system, the multiple disk drives are organized into disk arrays that are managed by an array controller. The array controller presents the disk array to the user as one or more disk drives and shields the user or host system from the details of managing the redundant array. However, the cost and complexity of the array controller increases with the increased reliability offered by the higher RAID levels. For example, RAID level 6 provides for recovery from a two-drive failure, but at a penalty in cost and complexity of the array controller, because the Reed-Solomon codes used in RAID level 6 are complex and can require significant computational resources.

It would be desirable to provide a system and method for managing information storage among plural disk drives that offers high performance and high capacity information storage at a reduced cost and with reduced complexity.

SUMMARY OF THE INVENTION

A system and method are disclosed for managing information storage among plural disk drives. In accordance with exemplary embodiments of the present invention, the system includes plural host interfaces and first and second elements. The first and second elements each comprise a set of disk drives for storing information. Each of the first and second elements is associated with an element frame. Each disk drive included in the first element is connected to a different one of the plural host interfaces during the element frame of the first element. The system includes a switch controller, configurable by at least one of the plural host interfaces, for selecting among the first and second elements, and for directing information from a first one of the plural host interfaces to a selected disk drive within the first element. The system also includes a frame controller for controlling a duration of each element frame.

The present invention may also be regarded as a method for managing information storage among plural disk drives. In accordance with exemplary embodiments of the present invention, a switch controller selects among first and second elements. The first and second elements each comprise a set of disk drives for storing information. Each of the first and second elements is associated with an element frame. Each disk drive included in the first element is connected to a different one of plural host interfaces during the element frame of the first element. The switch controller is configurable by at least one of the plural host interfaces. The switch controller directs information from a first one of the plural host interfaces to a selected disk drive within the first element. A frame controller controls a duration of each element frame.

BRIEF DESCRIPTION OF THE DRAWING FIGURES

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
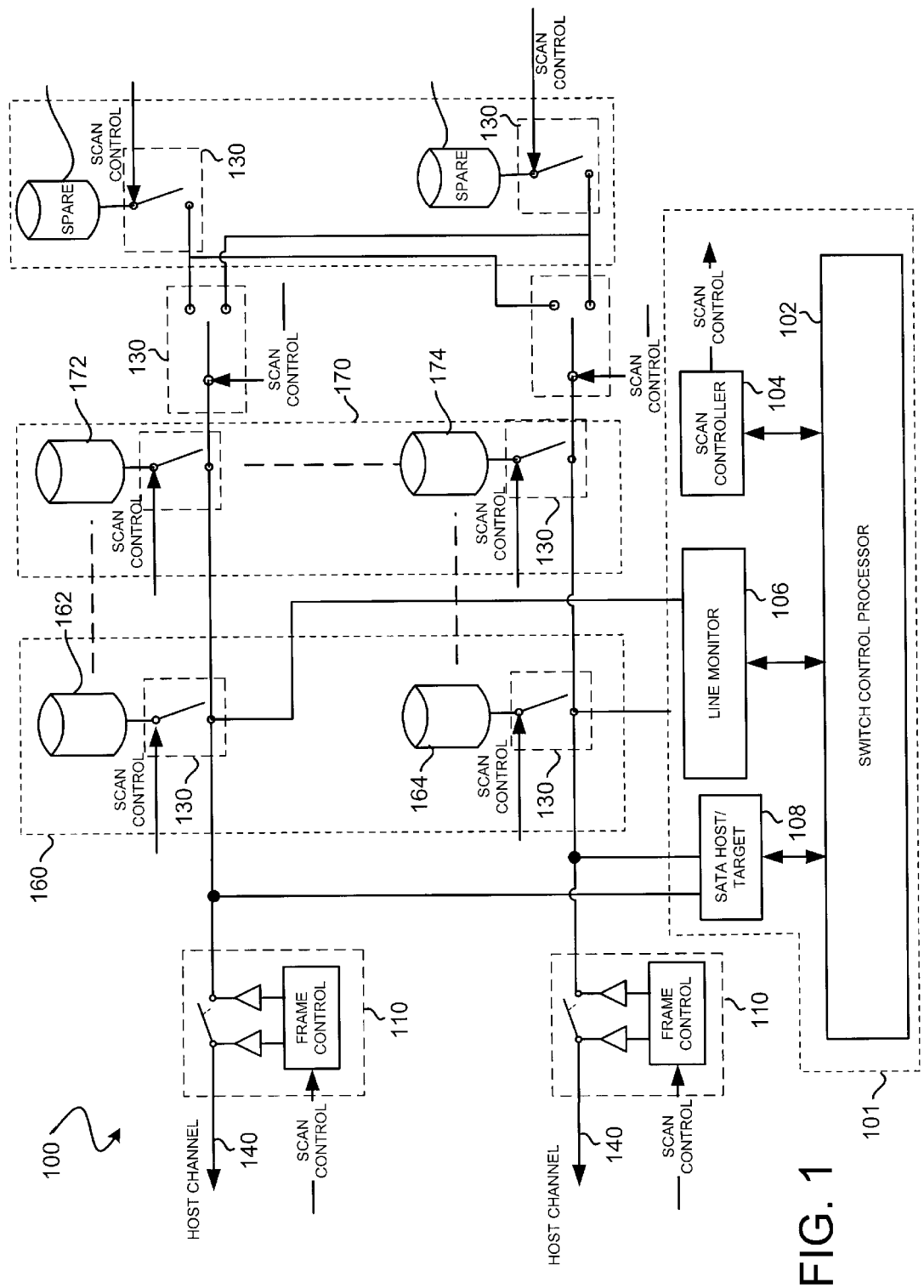
FIG. 1 is a block diagram of a system for managing information storage among plural disk drives in accordance with an exemplary embodiment of the present invention.

FIG. 1 a block diagram of a system 100 for managing information storage among plural disk drives in accordance with an exemplary embodiment of the present invention. According to exemplary embodiments, system 100 includes plural host interfaces 140. Each of plural host interfaces 140 can be any disk drive host interface, such as, for example, a SATA (serial advanced technology attachment) interface, a SAS (serial attached small computer system interface (SCSI)) interface, a fibre channel interface, an Ethernet interface, an InfiniBand™ interface, or any other serial disk drive host interface that can be used for accessing disk drives.

According to exemplary embodiments, system 100 includes first element 160 and second element 170. However, system 100 can include any number of elements. First element 160 and second element 170 each comprise a set of disk drives for storing information. As used herein, a "disk drive" can be any form of hard disk drive, such as a magnetic hard disk drive for storing computer data or any type of computer memory that can emulate a hard disk drive (e.g., a Random Access Memory (RAM) drive, which is a memory-resident program that uses part of a computer's RAM as if it were a hard disk drive). As used herein, an "element" is a collection or set of disk drives that can be connected or otherwise allocated to the their respective host interfaces 140. For example, first element 160 includes disk drives 162 and 164, while second element 170 includes disk drives 172 and 174. However, elements can include any number of disk drives. According to exemplary embodiments, each disk drive contained in the first and second elements is a SATA disk drive or A SAS disk drive, although each disk drive can be any type of disk drive that is accessible via a serial interface and that is compliant with plural host interfaces 140.

System 100 includes plural switches 130 for connecting each disk drive to a different one of plural host interfaces 140. According to exemplary embodiments, each of the plural disk drives in system 100 has an associated switch 130 to connect each disk drive to its associated one of plural host interfaces 140. Switch 130 can be any type of electronic or electro-optical switch capable of satisfying the requirements of each serial interface. The serial interfaces can have the same or different requirements.

Each of the first element 160 and second element 170 is associated with an element frame, with each disk drive included in the first element being connected to a different one of the plural host interfaces 140 during the element frame of the first element. According to an exemplary embodiment, there can be a one-to-one ratio of disk drives in an element to host interfaces, although any ratio of disk drives to host interfaces can be used. As used herein, an "element frame" is a duration of time during which the disk drives in an element are allocated, enabled, connected or otherwise instantiated to their respective host interfaces for communication with their respective host interfaces.

According to exemplary embodiments, system 100 includes a switch controller 101 for selecting among first element 160 and second element 170, although switch controller 101 can select among any number of elements. Switch controller 101 is configurable by at least one of plural host interfaces 140. Switch controller 101 directs information from a first one of plural host interfaces 140 to a selected disk drive within first element 160, although switch controller 101 can direct information from any of plural host interfaces 140 to any disk drive in any element of system 100.

As shown in FIG. 1, switch controller 101 can include, for example, switch control processor 102. Switch control processor 102 can be any type of processor, such as, for example, a microprocessor or firmware for processing commands and data from at least one of plural host interfaces 140. Switch control processor 102 can also include any type of computer memory, such as, for example, random access memory (RAM), cache memory or any other computer memory located internally or externally to switch controller 101, for receiving and storing information from at least one of plural host interfaces 140.

Figure 2:
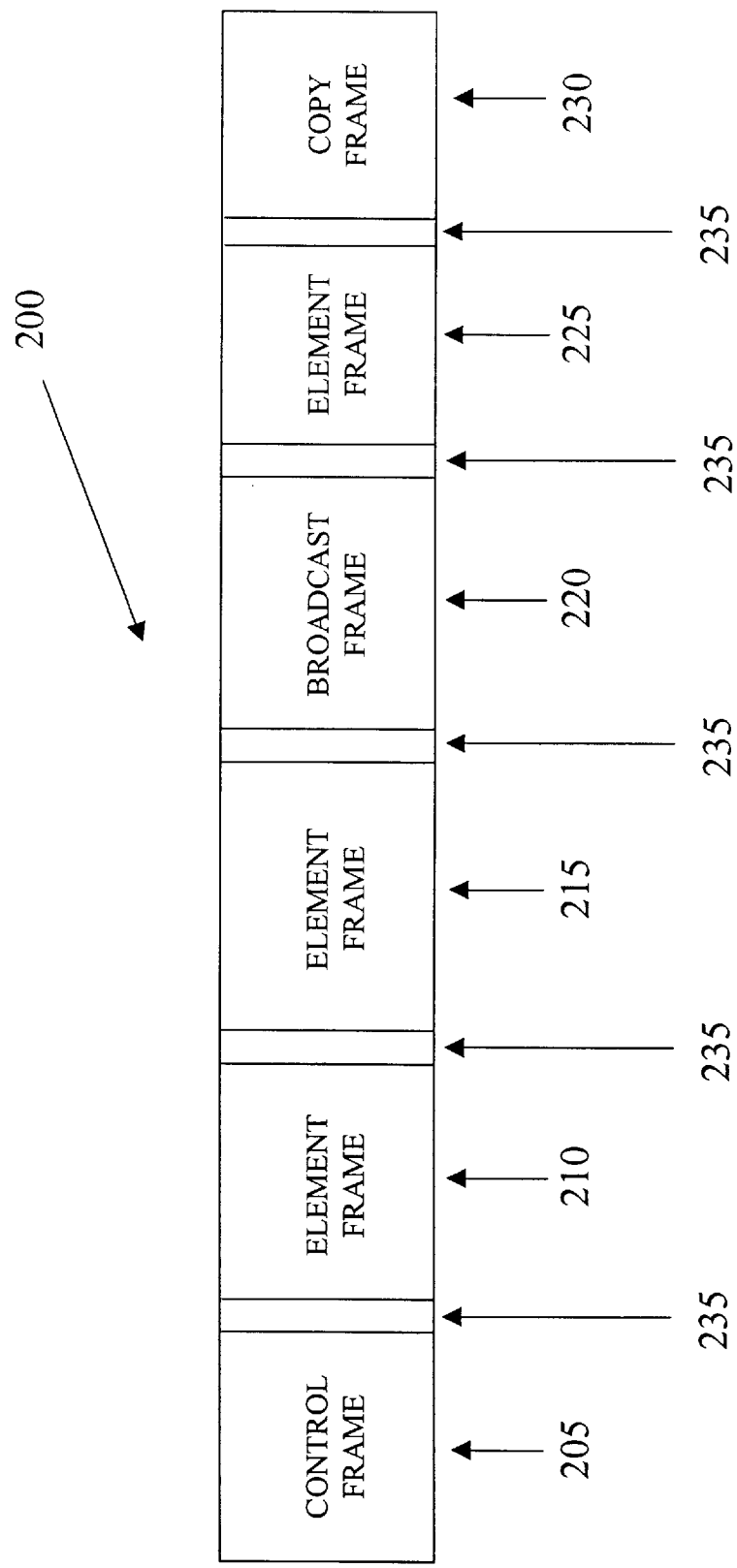
FIG. 2 is a block diagram illustrating a relationship of element frames to elements in accordance with an exemplary embodiment of the present invention.

According to exemplary embodiments, each element frame is included in a master frame that contains multiple frame types. As used herein, a "frame" is the time during which a particular function is performed in system 100. As discussed previously, an element frame is one type of frame. A "master frame" is a grouping of frames that are processed by system 100 in the sequence specified by the master frame. The master frame can include at least one of an element frame, a control frame, a broadcast frame, a poll frame, a copy frame, a mirror frame or any other type of frame that can be used or otherwise processed by system 100 to manage information storage. A master frame can include any combination of frames (including repetition of particular frames), of any type, in any number, and in any order or sequence. For purposes of illustration and not limitation, FIG. 2 illustrates an exemplary master frame 200. Master frame 200 includes six frames: control frame 205, element frame 210, element frame 215, broadcast frame 220, element frame 225 and copy frame 230. Between each element frame is an inter-frame transition 235, which is the time that system 100 takes to transition from one frame to another. For example, element frames 210, 215 and 225 can be different element frames or an element frame repeated one or more times within the master frame.

A different function is performed during each frame type. For example, control frame 205 connects at least one of plural host interfaces 140 to switch controller 101 to determine a status of, for example, switch controller 101 or any aspect of system 100. Control frame 205 can identify at least one of a sequence and a maximum duration of each frame in the master frame (e.g., master frame 200), although control frame 205 can identify any durational measure of each frame (e.g., actual duration, minimum duration, average duration, etc.). According to exemplary embodiments, a control frame can be enabled or otherwise instantiated at least on each pass of the master frame (e.g., as an individual frame in the master frame or inserted between frames during the inter-frame transition) for determining, for example, the status of switch controller 101.

A broadcast frame is a frame during which any type of host controller can communicate with all disk drives in system 100 using one or more of plural host interfaces 140. Alternatively, a broadcast frame is a frame during which any one disk drive can communicate with any number of other disk drives in system 100. For example, for a host controller to communicate with the disk drives on one or more of plural host interfaces 140 during the broadcast frame, each disk drive in system 100 can be connected to its respective host interface 140 through its respective switch 130. Thus, all disk drives of all elements on the same host interface can receive information from a host controller during a broadcast frame.

The host controller can communicate with any number of disk drives using any combination of plural host interfaces 140. Switch controller 101 includes a means for recognizing the broadcast frame and for communicating broadcast information received from a host controller to the plural disk drives. According to exemplary embodiments, the host controller notifies switch controller 101 that a broadcast frame is to begin. For example, the host controller can issue any type of signal sequence, such as, for example, an interrupt, to switch control processor 101 at the start of a broadcast frame that indicates to switch control processor 101 that a broadcast frame is to begin. The signal sequence can indicate the host interfaces 140 over which the host controller is to communicate. Upon receipt and recognition of the signal sequence, switch control processor 101 can enable the disk drives on the designated host interfaces 140 and direct the information from the host controller to those enabled disk drives during the broadcast frame.

A poll frame is a frame during which any number of disk drives communicate with any type of host controller over plural host interfaces 140. For example, the disk drives that are to communicate with the host controller during the poll frame can issue a signal sequence to the host controller, through switch controller 101, that indicates that a poll frame is to begin.

A copy frame is a frame during which information can be copied from one disk drive to one or more other disk drives in system 100.

A mirror frame is a frame during which information received over one of plural host interfaces 140 is directed by switch controller 101 to two or more disk drives simultaneously. However, a master frame can include any type of frame (including repeated frames), of any duration, in any order.

According to exemplary embodiments, switch controller 101 controls a sequence of plural frames in the master frame. For example, switch control processor 102 of switch controller 101 can be used to control the frame sequence. The frames in a master frame can be ordered in any sequence and instantiated any number of times. For example, a particular frame can be instantiated multiple times in a master frame if there is a substantial amount of activity occurring during that particular frame and additional processing is required to complete the designated activity, function or process.

System 100 includes a frame controller 110 for controlling a duration of each frame (e.g., an element frame or any other type of frame) included in the master frame. As shown in FIG. 1, each of plural host interfaces 140 can be associated with a frame controller. Frame controller 110 can be any type of electronic or electro-optical switch capable of satisfying the requirements of each serial interface, in which the serial interfaces can have the same or different requirements. Frame controller 110 can also include any type of processor, such as, for example, a microprocessor or firmware, and any type of computer memory, such as, for example, random access memory (RAM), cache memory or any other computer memory located internally or externally to frame controller 110, for receiving, storing and processing information (e.g., commands and data) from switch controller 101 to control the duration of each element frame. For example, the circuitry or firmware of frame controller 110 can be programmed or otherwise controlled by switch controller 101 using switch control processor 102, such that different elements receive different dedicated element frame times.

Frame controller 110 also controls a maximum duration of each frame in the master frame, although frame controller 110 can control any durational measure of any frame in the master frame (e.g., actual duration, minimum duration, average duration, etc.). For example, if a particular frame is underutilized, frame controller 110 can assign a shorter frame duration to that particular frame. Alternatively, if a particular frame is over-utilized (e.g., the disk drives in an element are requesting above-average amounts of service during an element frame), frame controller 110 can assign a longer duration to that particular frame.

The duration of each frame in the master frame can be, for example, pro assigned before operation of system 100 or dynamically changed during operation of system 100. Consequently, frame controller 110 can change the duration of any frame or frames in the master frame. According to exemplary embodiments, the frames in a master frame can be in any sequence or order, as controlled by switch controller 101 through switch control processor 102, with each frame in the master frame having any time length up to a maximum duration, as controlled by frame controller 110. The sum of the duration of each frame and inter-frame transition in the master frame is less than or equal to the total duration of the master frame.

Figure 3:
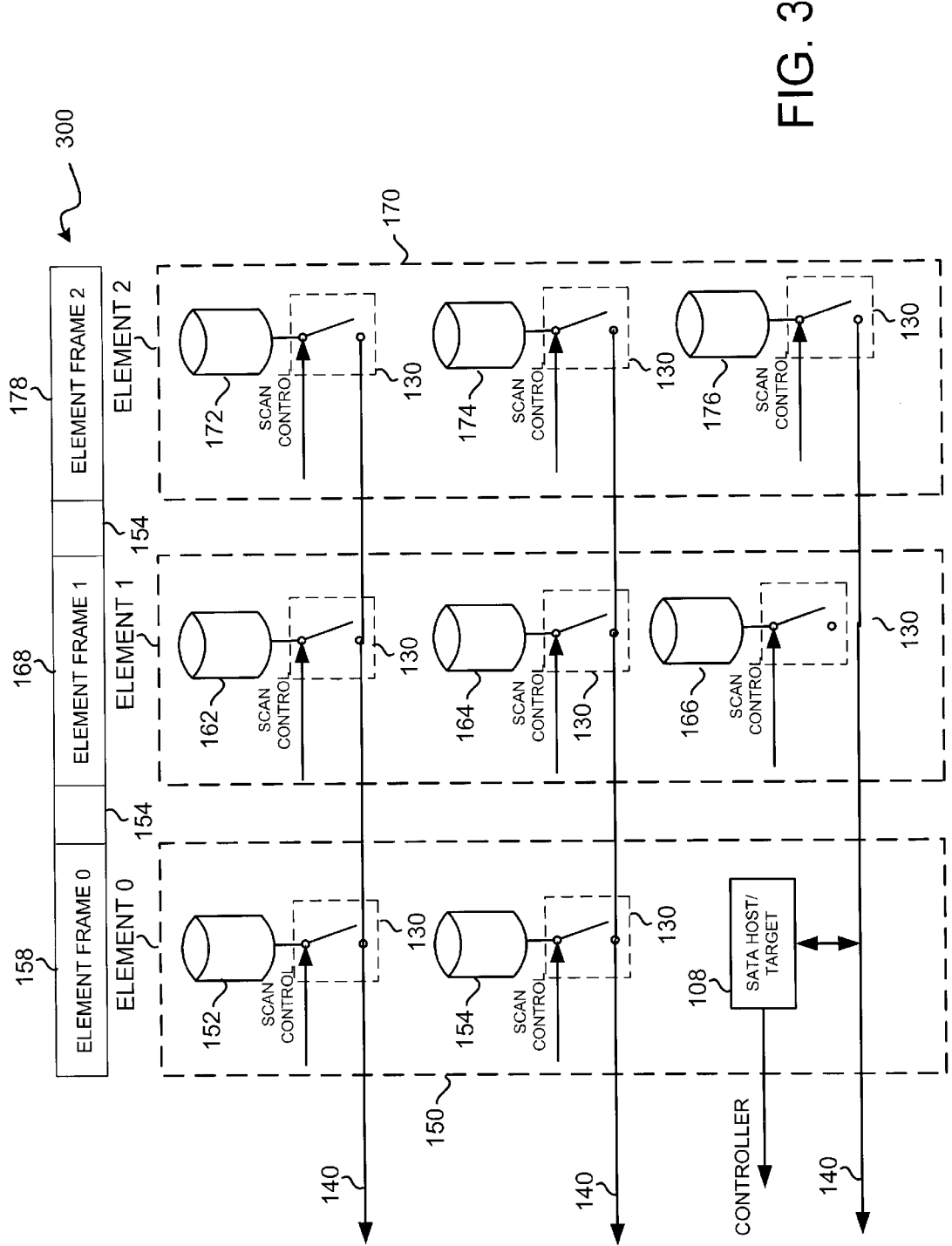
FIG. 3 is a block diagram illustrating a relationship between element frames and elements in accordance with an exemplary embodiment of the present invention.

According to exemplary embodiments, there is a one-to-one ratio of elements to element frames. FIG. 3 illustrates an exemplary relationship of element frames to elements. As shown in FIG. 3, there are three elements: zero element 150, with disk drives 152 and 154; first element 160, with disk drives 162, 164, and 166; and second element 170, with disk drives 172, 174, and 176. Associated with zero element 150 is zero element frame 158. Zero element frame 158 is the duration of time during which disk drives 152 and 154 of zero element 150 are each connected or otherwise allocated to their respective plural host interfaces 140. Associated with first element 160 is first element frame 168. First element frame 168 is the duration of time during which disk drives 162, 164, and 168 of first element 160 are each connected or otherwise allocated to their respective plural host interfaces 160. Associated with second element 170 is second element frame 178. Second element frame 178 is the duration of time during which disk drives 172, 174, and 176 of second element 170 are each connected or otherwise allocated to their respective plural host interfaces 140. However, the number of element frames will vary depending on the number of elements used in system 100.

The duration of each of zero element frame 158, first element frame 168 and second element frame 178 (or any other frames in the master frame) can be changed by frame controller 110. The sequence of these element frames (or any other frames in the master frame) can be changed by switch controller 101 using, for example, switch control processor 102.

Switch controller 101 includes a scan controller 104 for associating each disk drive of the plural disk drives to one of plural host interfaces 140. Scan controller 104 can be separate from switch control processor 102. For example, scan controller 104 can be any type of electronic control device that can receive commands for controlling one or more switches. If separate, scan controller 104 can be connected to switch control processor 102 using any type of connection that is capable of transmitting and receiving information. Alternatively, scan controller 104 can be integrated into switch control processor 102. If integrated, scan controller 104 can be either electronic circuitry that comprises switch control processor 102, or a software code module that is run on or by switch control processor 102.

As shown in FIG. 1, according to an exemplary embodiment, scan controller 104 is connected to each switch 130 and is connected to each of the plural disk drives in system 100. Scan controller 104 can be connected to each switch 130 and to each disk drive using any type of connection that is capable of transmitting and receiving information. Thus, according to exemplary embodiments, switches 130 are controlled by switch controller 101 using switch control processor 102 and scan controller 104. For example, switch control processor 102 can instruct or otherwise command scan controller 104 to connect, enable, or otherwise activate switches 130 in an element to establish connections between the disk drives in that element and their respective plural host interfaces 140.

As shown in FIG. 1, scan controller 104 is also connected to each frame controller 110 using any type of connection that is capable of transmitting and receiving information. Frame controller 110 is responsive to scan controller 104 for terminating an element frame to transition to a next element frame. According to an exemplary embodiment, the end of a frame occurs when the end of a predetermined or dynamically-determined time duration of the frame is reached. For example, to transition out of an element frame in a master frame, switch controller 101 uses switch control processor 102 to establish an end of the element frame by commanding scan controller 104 to instruct frame controllers 110 to de-allocate, disable, or otherwise disconnect the corresponding switches on the plural host interfaces 140 to which the disk drives in the element are connected. Thereafter, switch control processor 102 can issue a signal sequence to host controllers connected to plural host interfaces 140 and to the disk drives of the element that indicates that the element frame is terminated.

The signal sequence to the host controllers can be, for example, an interrupt, a command or any other type of signal sequence that can notify the host controllers of the change in frame. The signal sequence to the disk drives associated with the element can be, for example, an interrupt, a command or any other type of signal sequence from scan controller 104 that causes the disk drives in the element to cease, suspend or otherwise interrupt their interaction with their associated plural host interfaces. 140. For example, if plural host interfaces 140 are SATA interfaces and the disk drives of the element are SATA disk drives, the signal sequence can be a SATA data transfer disconnect. The SATA data transfer disconnect results in plural host interfaces 140 dropping the ACK (acknowledgment) state, which terminates the data transfer between plural host interfaces 140 and the disk drives of the element at a known and recoverable state.

Subsequently, scan controller 104 can issue a signal sequence to each switch 130 of each disk drive in the element to disconnect each disk drive from its associated plural host interface 140. The signal sequence to each switch 130 can be, for example, an interrupt, a command or any other type of signal sequence from scan controller 104 that causes a switch 130 to disconnect the disk drive from its associated host interface 140.

To prevent loss of information (e.g., commands or data) during an element frame transition, switch control processor 102 can monitor plural host interfaces 140 connected during the element frame to determine if any of plural host interfaces 140 are in a transfer state. For example, according to the SATA protocol, the SATA signaling levels provide for the detection of an IDLE state, a TRANSFER state, a BUSY state, and an INTERRUPT state. According to an exemplary embodiment, if plural host interfaces 140 are SATA host interfaces, switch control processor 102 can determine if any the plural host interfaces 140 connected during the element frame are in a TRANSFER state. If all of plural host interfaces 140 connected during the element frame are not in a TRANSFER state, switch control processor 102 can instruct scan controller 104 to command frame controller 110 to transition out of the element frame to another frame in the master frame.

According to an alternate exemplary embodiment, frame controller 110 terminates the element frame associated with the first element by issuing a signal sequence to plural host interfaces 140 and to the disk drives associated with the first element. The signal sequence can be an interrupt, a command, or any other type of signal sequence that notifies plural host interfaces 140 and notifies the disk drives associated with the first element to cease, suspend or otherwise interrupt their current action, process, or function so that the element frame can be terminated. For example, if plural host interfaces 140 are SATA interfaces and the disk drives of the element are SATA disk drives, the signal sequence can be a SATA data transfer disconnect. Once ceased, suspended, or otherwise interrupted, frame controller 110 can terminate the element frame.

According to either exemplary embodiment, once an element frame is terminated, during the inter-frame transition, one or more host controllers connected to plural host interfaces 140 can query switch control processor 102 to determine, for example, the status of the disk drives in the next element frame. According to exemplary embodiments, during an inter-frame transition, although the elements are not active, the corresponding frame controllers are active.

Switch controller 101 includes a line monitor 106 for determining a state of activity of at least one disk drive in a selected one of the first and second elements. According to exemplary embodiments, line monitor 106 can determine whether or not the disk drives in an element are quiescent or otherwise idle. Line monitor 106 can be separate from switch control processor 102. For example, line monitor 106 can be a disturbance or idle detector or any other form of circuit for detecting the existence of activity on a connection. For example, as shown in FIG. 1, line monitor 106 can be connected to each of switches 130 in each of the elements using any type of connection that is capable of transmitting and receiving information.

Alternatively, line monitor 106 can be integrated into switch control processor 102. If integrated, line monitor 106 can be either circuitry that comprises switch control processor 102, or a software code module that is run on or by switch control processor 102. In either exemplary embodiment, once a disk drive of an element is connected to its respective host interface 140 using its respective switch 130, if there is any activity between the disk drive and its respective host interface 140, the disturbance detector of line monitor 106 can detect the presence of activity and notify switch control processor 102 that one or more drives of an element are active (i.e., not idle).

Line monitor 106 can be used by switch controller 101 to skip frames in the master frame. As used herein, to "skip" a frame is to transition over a frame without enabling or otherwise instantiating the frame. According to exemplary embodiments, switch controller 101 can be configured to skip at least one frame in the sequence of plural frames in the master frame. For example, switch controller 101 can be configured to skip an element frame of the master frame when at least one disk drive in the first element is idle. However, switch controller 101 can skip any element frame associated with any element when at least one disk drive in the element is idle.

According to exemplary embodiments, frame controller 110 is responsive to line monitor 106 for detecting an idle condition of at least one disk drive in the first element for skipping to a next element frame. In such an exemplary embodiment, line monitor 106 can scan or otherwise monitor the disk drives in an element. For example, if the next frame in the master frame is an element frame, then before transitioning to the next (element) frame in the master frame, line monitor 106 can monitor the next (element) frame in the master frame to determine if the disk drives in that element are idle. If line monitor 106 detects that, for example, at least one disk drive in a the next element is idle, line monitor 106 can provide an interrupt or other signal sequence to switch control processor 102 to inform switch control processor 102 that the disk drives in the element are idle. Thereafter, switch control processor 102 can instruct scan controller 104 to command frame controller 110 to skip over the element frame to another frame in the master frame. However, frame controller 110 can be used to skip over any frame in the master frame.

According to an alternate exemplary embodiment, all frames in the master frame can be monitored or otherwise processed in parallel to determine, for example, which frames in the master frame can be skipped by frame controller 110. In such an alternate exemplary embodiment, line monitor 106 can scan or otherwise monitor the disk drives in all elements of system 100 to determine which disk drives in which elements are idle. If line monitor 106 detects that, for example, at least one disk drive in one or more elements is idle, line monitor 106 can provide an interrupt or other signal sequence to switch control processor 102 to inform switch control processor 102 that the disk drives in those elements are idle. Thereafter, switch control processor 102 can instruct scan controller 104 to command frame controller 110 to skip over the element frames associated with those idle elements to another frame in the master frame. By monitoring all frames in the master frame in parallel frame controller 110 can skip over any number, combination, or sequence of frames in the master frame.

According to exemplary embodiments, the sequence of frames in the master frame can be altered, and frames within the master frame can be skipped. If the frame sequence is changed or a frame is skipped, this information is communicated to, for example, a host controller connected to at least one of plural host interfaces 140. According to an exemplary embodiment, the control frame of the master frame can be used to communicate the sequence and skipping information to a host controller connected to at least one of plural host interfaces 140. For example, the sequence information can be read by the host controller or communicated to a host controller by switch control processor 102 during the control frame, for example, at the start of the master frame. If a frame is skipped while a master frame is being processed, a control frame can be inserted by switch controller 101 using switch control processor 102 into the master frame either before or after the skipped frame, for example, during the inter-frame transition. During the inserted control frame, the host controller can read, or switch controller 101 can communicate to the host controller, status information that indicates that a frame was skipped and that a subsequent frame will be processed instead. The sequencing and skipping information can be included in the status information that is communicated during a control frame.

Idle monitor 106 can be used by switch control processor 102 to force idle the disk drives in an element to transition the element frame to another frame in the master frame without loss of information (e.g., data, commands). During an element frame, switch control processor 102 can command line monitor 106 to issue a signal sequence to the disk drives in an element during an element frame. The signal sequence commands the disk drives in the element to discontinue use of their associated host interfaces. The signal sequence can be, for example, an interrupt or any form of signal sequence for commanding a disk drive to stop communicating over its respective host interface 140, for example, a SATA data transfer disconnect. As the disk drives in an element go idle, idle monitor 106 can detect the idle condition of at least one disk drive in the element. Once all or any subset of the disk drives in an element are idle, line monitor 106 can provide an interrupt or other signal sequence to switch control processor 102 to inform switch control processor 102 that the at least one disk drive in the element is idle. Thereafter, switch control processor 102 can instruct scan controller 104 to command frame controller 110 to skip to another frame in the master frame.

According to exemplary embodiments, as the disk drives in the element are forced idle, if the next frame in the master frame is an element frame, idle monitor 106 can detect an idle condition of at least one disk drive in next element frame. As discussed previously, if at least one disk drive in the next element frame is idle, idle monitor 106 can notify switch control processor 102 of this condition. Consequently, once the at least one disk drive in the current element frame has become idle, switch control processor 102 can skip the next element frame to another frame in the master frame. Switch control processor 102 can skip any number of element frames in the master frame using such a mechanism.

Alternatively, switch control processor 102 can use the notification from line monitor 106 to instruct frame controller 110 to alter or otherwise modify the duration of an element frame, for example, to either shorten or lengthen the duration of an element frame depending on the utilization of the disk drives enabled during an element frame. For example, if an element frame is underutilized (e.g., some or all of the disk drives enabled during that element frame are consistently idle), the duration of that element frame can be shortened. The time taken from one element frame can then be, for example, allocated to another frame in the master frame, e.g., a frame that is over-utilized or that requires more time being enabled or otherwise instantiated to carry out the processing associated with that frame Switch controller 101 includes a host interface controller 108 for communicating between switch controller 101 and one of the plural disk drives, and for communicating between switch controller 101 and one of plural host interfaces 140. For example, host interface controller 108 can be any type of device that can receive and transmit information using any disk drive interface protocol for accessing and controlling disk drives. According to exemplary embodiments, communication is performed by host interface controller 108 using a disk drive interface. For example, the disk drive interface can be at least one of a SATA interface and a SAS interface. However, the disk drive interface of host interface controller 108 for communicating information (e.g., commands and data) through host interface controller 108 can also include, but is not limited to, an IDE/ATA (Integrated Drive Electronic/Advanced Technology Attachment) interface, a SCSI interface, a fibre channel interface, an Ethernet interface, an InfiniBand™ interface, a PCI (Peripheral Component Interconnect) interface, or any other interface that can be used for accessing and controlling disk drives.

Host interface controller 108 can be separate from switch control processor 102. If separate, host interface controller 108 can be connected to switch control processor 102 using any type of connection that is capable of transmitting and receiving information. Alternatively, host interface controller 108 can be integrated into switch control processor 102. If integrated, host interface controller 108 can be either electronic circuitry that comprises switch control processor 102, or a software code module that is run on or by switch control processor 102.

According to exemplary embodiments, switch controller 101 communicates with the plural disk drives of system 100 using the commands of the disk drive interface associated with the disk drives that comprise each element. For example, if disk drives 162 and 164 of first element 160 are SATA disk drives, then switch control processor 102 of switch controller 101 communicates with disk drives 162 and 164 through host interface controller 108 using SATA interface commands. Switch control processor 102 can communicate with the disk drives of system 100 using any disk drive interface, depending on the type of disk drives being used. The disk drive interface can be different not only between elements, but also between disk drives within an element. Thus, host interface controller 108 can support multiple disk drive interfaces, as can switch control processor 102.

According to exemplary embodiments, switch controller 101 communicates with one of plural host interfaces 140 using the host interface commands supported by plural host interfaces 140. For example, if one of plural host interfaces 140 is a SATA host interface, then switch control processor 102 communicates with the one of plural host interfaces 140 through host interface controller 108 using SATA host interface commands. Switch control processor 102 can communicate with any of plural host interfaces 140 using any host interface commands, depending on the type of host interface commands supported by the host interfaces 140. Thus, host interface controller 108 can support multiple host interfaces and multiple types of host interface commands, as can switch control processor 102.

According to exemplary embodiments, in communicating with plural host interfaces 140, switch controller 101 can act as a "virtual" disk drive by emulating a disk drive for receiving commands from one of plural host interfaces 140. In other words, at least one of plural host interfaces can command or otherwise control switch controller 101 using host interface commands (e.g., SATA or SAS host interface commands) as if switch controller 101 was a disk drive. For example, switch control processor 102 can be controlled by one of plural host interfaces 140 using any type of disk drive interface protocol that also supports the accessing and controlling of disk drives. According to exemplary embodiments, if at least one of plural host interfaces 140 is a SATA interface, switch control processor 102 can be configured and controlled by the at least one of plural host interfaces 140 through host interface controller 108 using SATA disk drive protocol commands. Thus, the configuration, status, and control information associated with switch controller 101 can be communicated between switch controller 101 and plural host interfaces 140 using the disk drive interface protocol commands (e.g., SATA disk drive interface protocol commands) supported by plural host interfaces 140.

System 100 includes a third element 180, comprising plural disk drives (e.g., disk drives 182 and 184) for storing information. According to exemplary embodiments, switch controller 101 uses switch control processor 102 to allocate a disk drive in third element 180 to replace a disk drive in one of first element 160 and second element 170. Thus, third element 180 can act as a "spares" element for replacing any disk drive that fails in system 100. However, any number of spares elements can be used in system 100, with each spares element having any number of disk drives.

For example, if a disk drive (e.g., disk drive 162) in first element 160 fails or is otherwise non-responsive, switch controller 101 can detect the failure, e.g., by using line monitor 106 to detect that the disk drive has unexpectedly gone idle during an element frame. Upon failure detection, switch controller 101 can use switch control processor 102 to instruct scan controller 104 to switch out the failed drive of first element 160 and switch in a disk drive from third element 180 (i.e., the "spares" element) to replace the failed or otherwise non-responsive disk drive. This procedure is generally referred to as "hot swapping" or "hot sparing."

Thus, the disk drives of the spares element (i.e., third element 180) can be switched into any element at any time by switch controller 101 using switch control processor 102 and scan controller 104. However, switch control processor 102 can instruct scan controller 104 to replace any disk drive in any element using any disk drive from any other element. Such redundancy provides for the uninterrupted operation of system 100 in case of failure of one or more of the disk drives of an element.

According to exemplary embodiments, configuration information is stored in one of the first and second elements. The configuration information is used to configure at least one of switch controller 102 and frame controller 110. However, "configuration information" can be any type of information that can be used to configure or control any part or component of system 100 (e.g., any combination of the plural disk drives, switch controller 102, host interfaces 140, etc.). For example, the configuration information can be a record of the number and types of disk drives that populate system 100.

According to exemplary embodiments, at least one of the elements in system 100 is a default element from which configuration information can be retrieved upon initialization of system 100. The default element is the element of system 100 that is selected and active upon initialization, power-up reset, or after any type of reset or re-boot of system 100. A shown in FIG. 3, for purposes of illustration, but not limitation, zero element 150 can be the default element, any element or combination of elements of system 100 can be the default element, such as either first element 160 or second element 170. Configuration information for configuring any or all of system 100 can be stored in, for example, at least one of disk drive 152 and disk drive 154 of zero element 150. The operation of system 100 upon initialization will now be described, although the following procedure can also take place after any type of reset or re-boot of system 100.

Upon initialization, the default element, e.g., zero element 150, is enabled. As can be seen from FIG. 3, the default element (e.g., zero element 150) includes disk drives 152 and 154, which are connected or otherwise allocated to their respective host interfaces 140 upon initialization. Connected to one of host interfaces 140 of the default element is switch controller 101. According to exemplary embodiments, switch controller 101 is connected to one of plural host interfaces 140 of the default element through host interface controller 108. According to exemplary embodiments, upon initialization, a host controller connected to one or more of plural host interfaces 140 can retrieve or otherwise download configuration information from the disk drives of the default element. The configuration information allows the host controller to determine the status and configuration of system 100 and to acquire the information necessary to, for example, configure switch controller 101 or any other component of system 100. For example, the host controller can retrieve the configuration information from the default element and then program the firmware of switch controller 101 under software control of the host controller.

Thus, according to exemplary embodiments, upon initialization, a host controller can download configuration information from the default element and then use this information to configure or otherwise program switch controller 101 (through, for example, host interface controller 108) to access and control system 100. Once programmed, switch controller 101 can then access and control all disk drives in all elements of system 100. According to an alternate exemplary embodiment, switch controller 101 can download configuration information from one or more of the disk drives of the default element to acquire the configuration information necessary for accessing and controlling system 100. In either exemplary embodiment, if, for example, initialization fails and no configuration is retrieved or otherwise downloaded from the default element, then the host controller and/or switch controller 101 will have access to at least the disk drives of the default element.

According to an alternate exemplary embodiment, a subset of host interfaces 140 can be configured upon initialization for use with the disk drives of the elements of system 100, and the remaining host interfaces 140 can be used for failover purposes. In other words, the disk drives of each element of system 100 can be allocated to a subset of plural host interfaces 140. For example, half of host interfaces 140 can be configured and allocated to the disk drives of an element, although any subset of host interfaces 140 can be used. Switch control processor 102 or line monitor 106 can detect when activity unexpectedly ceases on one or more of host interfaces 140, indicating that one or more of the allocated host interfaces 140 are no longer functioning properly. When such a failure situation is detected, one or more of the disk drives of the element that are allocated to those failed host interfaces can be switched over to the backup host interfaces 140, for example, the other half or remaining subset of host interfaces 140 that were not previously allocated. Such redundancy provides for the uninterrupted operation of system 100 in case of failure of one or more of host interfaces 140.

According to exemplary embodiments, the host controller connected to at least one of plural host interfaces 140 can be any type of controller that is capable of accessing and controlling disk drives through at least one disk drive host interface. For example, the host controller can be any type of disk array controller, such as, for example, a RAID controller or any other type of disk controller that is capable of accessing and controlling disk drives through at least one disk drive host interface. According to an exemplary embodiment, the host controller can be connected to any type of host computer system, such as, for example, a general-purpose personal computer, a workstation, or any other type of computer system. The host computer system can use any operating system, such as, for example, Microsoft Windows™, Linux™, MacOS™, Solaris™, or any other computer operating system that is capable of communicating with disk drives.

According to exemplary embodiments, the host controller can be internal to system 100, internal to the host computer system, or external to both system 100 and the host computer system. According to these exemplary embodiments, the host controller communicates with system 100 using the disk drive host interface of plural host interfaces 140. However, the host controller can be connected to and communicate with the host computer system using any storage interface, such as, for example, a SATA interface, a SAS interface, an IDE/ATA interface, a SCSI interface, a fibre channel interface, an Ethernet interface, an Infini-Band™ interface, a PCI interface, or any other type of storage interface. Thus, the host controller can communicate with the host computer system using a storage interface that can be the same as or different than the disk drive host interface used to communicate with system 100 over plural host interfaces 140.

According to exemplary embodiments, the information directed between the selected disk drive within the first element and the first host interface includes a tag for communicating information. The tag uniquely identifies an element from other elements in system 100, so that information can be communicated between a particular element and the host interfaces. The tag can include an identification field for identifying the first element and a command field for command information for the first element. However, the tag can include any type of fields for communicating any type of information. Thus, the tag can be any type of tag that can be used for differentiating messages between the different elements of system 100. For example, the tag can be a queue tag, such as that used in the SCSI protocol, the SATA command queue tag used in the SATA protocol, the frame information structure field of a frame used in the SATA protocol, the switch resource manager field used in the SATA protocol, the route extension field used in the SATA protocol, or any other type of tag. Queue tags for the SCSI protocol are described, for example, in U.S. Pat. Nos. 5,603,066 and 5,781,803, the disclosures of which are hereby incorporated by reference in their entireties.

Figure 4:
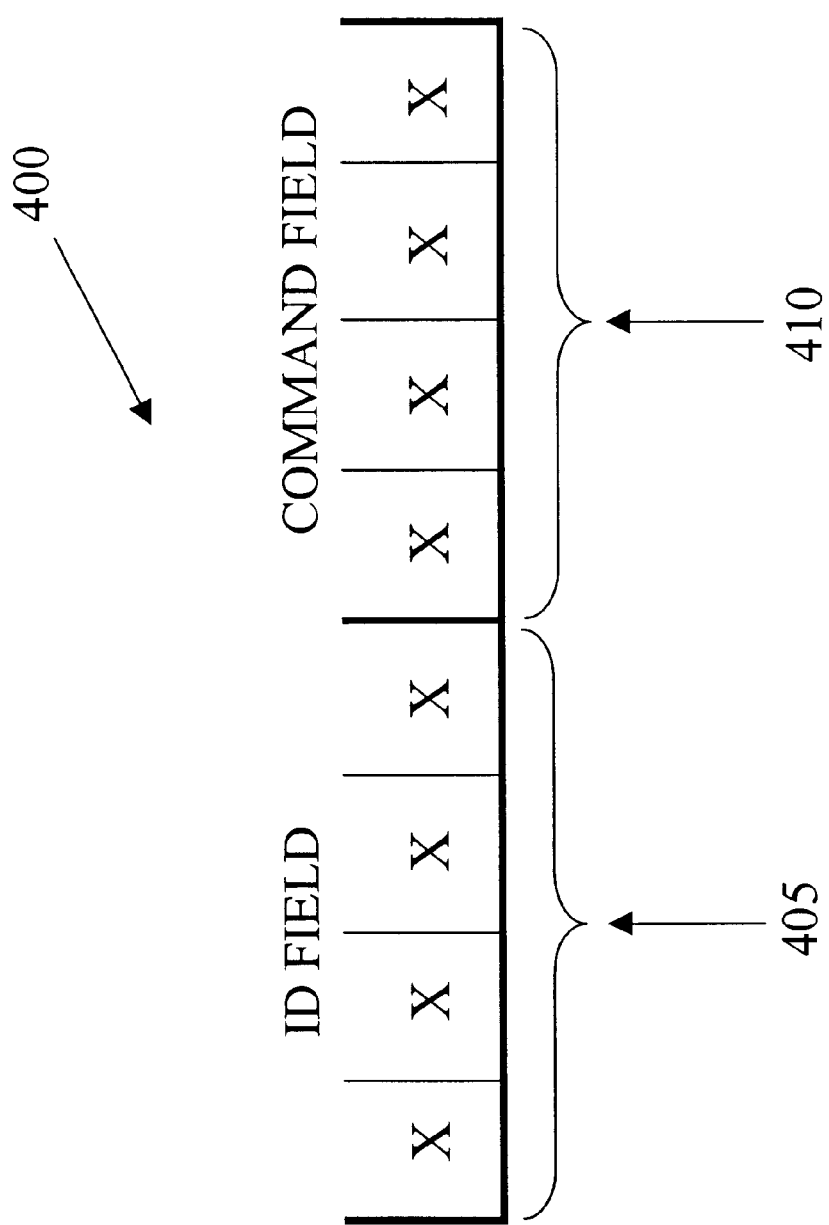
FIG. 4 illustrates an exemplary tag for communicating information in accordance with an exemplary embodiment of the present invention.

For purposes of illustration and not limitation, FIG. 4 illustrates an example of a tag 400. For example, tag 400 can include two fields: an identification (ID) field 405 and a command field 410. However, tag 400 can have any number of fields to carry any type of information. Although the exemplary embodiment of tag 400 shown in FIG. 4 is eight bits long and uses four bits for ID field 405 and four bits for command field 410, tag 400 can be any number of bits long, and subdivided into any number of fields, with each field being any subset of the number of bits of tag 400. According to exemplary embodiments, ID field 405 can include an element identification (e.g., the number or any other designation) of the element in system 100 to and from which information is to be communicated. The information to and/or from the element identified in ID field 405 can be carried in command field 410. Command field 410 can include any type of information (e.g., commands or data) to be used by the element designated in ID field 405.

Thus, according to exemplary embodiments, to communicate information from each of plural host interfaces 140, to the disk drive in the element connected to the respective one of plural host interfaces 140, the element ID of the element to which the information is to be sent is included in ID field 405 of tag 400 along with the information in command field 410 to be used by the element. Upon receipt by switch control processor 102, switch control processor 102 can use ID field 405 of tag 400 to route the information to the appropriate allocated disk drive of the respective element. To communicate information from one or more disk drives in an element to their respective plural host interfaces 140, switch control processor 102 can assemble a tag with ID field 405 holding the element ID of the element sending the information, and command field 410 holding the information to be sent. Switch control processor 102 can then route the tag to the respective one of plural host interfaces 140. Using tags according to exemplary embodiments of the present invention allows information to be communicated between the disk drives of any number of elements and their respective host interfaces, while maintaining a designation of the element associated with the information so that the information is routed correctly.

According to exemplary embodiments, at least one of the first and second elements is a member of a RAID (redundant array of inexpensive disks, also known as redundant array of independent disks) set. The fundamental concepts of RAID technology are discussed in, for example, U.S. Pat. No. 5,950,230. Thus, according to exemplary embodiments, the disk drives of any one or combination of elements of system 100 can be configured as, for example, a RAID set or any other type of disk array system that provides fault tolerance and improved performance.

According to exemplary embodiments, at least one of the elements of system 100 can be configured as, for example, a RAID set, upon initialization of system 100. For example, the configuration information stored in one of the elements of system 100 (i.e., the default element) can include information for configuring at least one of the elements as a RAID set. The RAID configuration information includes, for example, the designation of the at least one element to be configured as a RAID set, RAID information for configuring the at least one element as a RAID set (e.g., the designated RAID level and the associated information for configuring the at least one element for the designated RAID level), etc.

The RAID configuration information can be downloaded or otherwise retrieved at initialization by, for example, a host controller, which can then configure the appropriate element (s) using switch control processor 102 via host interface controller 108, and configure switch control processor 102 as a corresponding RAID controller for the configured elements. Alternately, at initialization, switch control processor 102 can retrieve or otherwise download the RAID configuration information directly from the default element and use this RAID configuration information to configure the appropriate element(s) and configure itself as the corresponding RAID controller for the configured elements. Thereafter, the at least one RAID-configured element of system 100 will function as, for example, a RAID set.

According to exemplary embodiments, switch controller 101 is configured to establish a connection between at least two disk drives of the plural disk drives to copy information between the at least two disk drives. The information can be copied between the at least two disk drives during a copy frame. For example, during a copy frame, switch control processor 102 can instruct scan controller 104 to connect any disk drive of any element (i.e., the source disk drive) to any number of other disk drives in any other elements (i.e., the destination disk drives). Once the disk drives are connected during the copy frame, switch control processor 102 can send a signal sequence to the source and destination disk drives to initiate the transfer of information from the source to the destination disk drive(s). The signal sequence can be any type of signal sequence that is capable of initiating the copying of information, such as, for example, an interrupt, a unique copy-to-copy command, or any other type of signal sequence.

Once initiated during the copy frame, the copying of information can be carried out autonomously between the source and destination disk drives during the copy frame or while other frames are being processed by switch control processor 102 (e.g., at some designated future time). Once the copying is completed, either the source or destination disk drives can send a signal sequence, for example, an interrupt, to switch control processor 102 notifying switch control processor 102 that the copying is completed.

The copying mechanism according to exemplary embodiments can be used, for example, for element sparing. In such an exemplary embodiment, once switch control processor 102 receives the signal sequence indicating that the copying is completed, switch control processor 102 can instruct scan controller 104 to switch out the source disk drive from its source element and switch in the destination disk drive into the source element to replace the source disk drive.

According to exemplary embodiments, switch controller 101 is configured to establish a connection between the first host interface and at least two disk drives of the plural disk drives such that each of the at least two disk drives receives the information from the first host interface. The mirroring of data to two or more disk drives can occur during a copy frame or a mirror frame. For data mirroring, switch control processor 102 instructs scan controller 104 to switch in or otherwise allocate at least two disk drives (i.e., the slaves) of system 100 to one of plural host interfaces 140 (i.e., the master). Thus, all information communicated from the one of plural host interfaces 140 is written to each of the at least two disk drives allocated to the one of plural host interfaces 140. Data mirroring according to exemplary embodiments of the present invention can also be performed between a source disk drive and at least two destination disk drives using the same mechanism.

According to an alternate embodiment, switch control processor 102 or a host controller can buffer the information or a subset of the information to be communicated to the at least two disk drives from either the host controller or a source disk drive. As each disk drive in its respective element is enabled or otherwise instantiated during its respective element frame, switch control processor 102 or the host controller can communicate the buffered information to each destination disk drive. In either embodiment, once the communication of information is completed, the destination disk drives confirm the completion of the data mirroring to the source disk drive, switch control processor 102, or host controller before the source disk drive, switch control processor 102 or host controller completes the data mirroring command.

According to exemplary embodiments, each disk drive in each element can include the components of system 100 so as to create N sub-elements for each element, where N is any number. In other words, the structure of system 100 can be replicated for each disk drive in each element to create sub-elements within each element with the same structure as system 100. The replication of the structure of system 100 for each disk drive in each element can occur to any desired depth of replication. For example, each element can have N sub-elements, with each sub-element having M sub-sub-elements (where M is any number), and so on to any desired level of complexity.

Thus, according to exemplary embodiments, each of the plural disk drives can be a set of disk drives, in which each set of disk drives includes a switch controller and a frame controller. In addition, for example, each set of disk drives can include at least one of a scan controller, a line monitor, and a host interface controller. The functions and mechanisms of the individual components (e.g., switch control processor, frame controller, scan controller, line monitor, host interface controller) at each level of sub-element are the same as that described previously. Such a replication of functionality at the sub-element level allows each sub-element to be controlled as its own array of disks, using the same command and control mechanisms used for controlling system 100.

According to an exemplary embodiment, all of the disk drives in the set of disk drives act as a single, virtual disk drive. For purposes of illustration and not limitation, if each disk drive in an element is replaced by a set of, for example, four disk drives (or any number of disk drives), the four drives can be controlled and accessed as a single, large disk drive. In such an embodiment, the element frame associated with the element comprised of such sets of "virtual" disk drives would be the same as the corresponding element frame with individual disk drives (i.e., no sets of disk drives within the element).

Alternatively, the element frame associated with the first element includes plural sub-element frames, in which each sub-element frame is associated with a set of disk drives in the first element. According to this alternate exemplary embodiment, each set of disk drives in the sub-element of an element is associated with a sub-element frame. The sub-element frame has all the characteristics and features of an element frame. The maximum duration of a sub-element frame is less than a maximum duration of the element frame. The frame controller (e.g., sub-frame controller) controls the maximum duration of each sub-element frame in the element frame. The switch controller (e.g., sub-switch controller) controls a sequence of each sub-element frame in the element frame.

However, each element frame in the master frame can be subdivided into any type of sub-frame, such as a sub-element frame, a sub-control frame, a sub-broadcast frame, a sub-poll frame, a sub-copy frame, or any other type of sub-frame. Each type of sub-frame has the same characteristics and features, and is controlled in the same manner, as the corresponding type of (regular) frames discussed previously. Thus, each element frame can act as a sub-master frame that contains multiple sub-frame types. Just as the components of system 100 can be replicated for each set of disk drives in each element to any desired level of complexity, the corresponding element frame can be subdivided into any desired number of sub-frames (e.g., a sub-element frame divided into sub-sub-element frames).

Figure 5A:
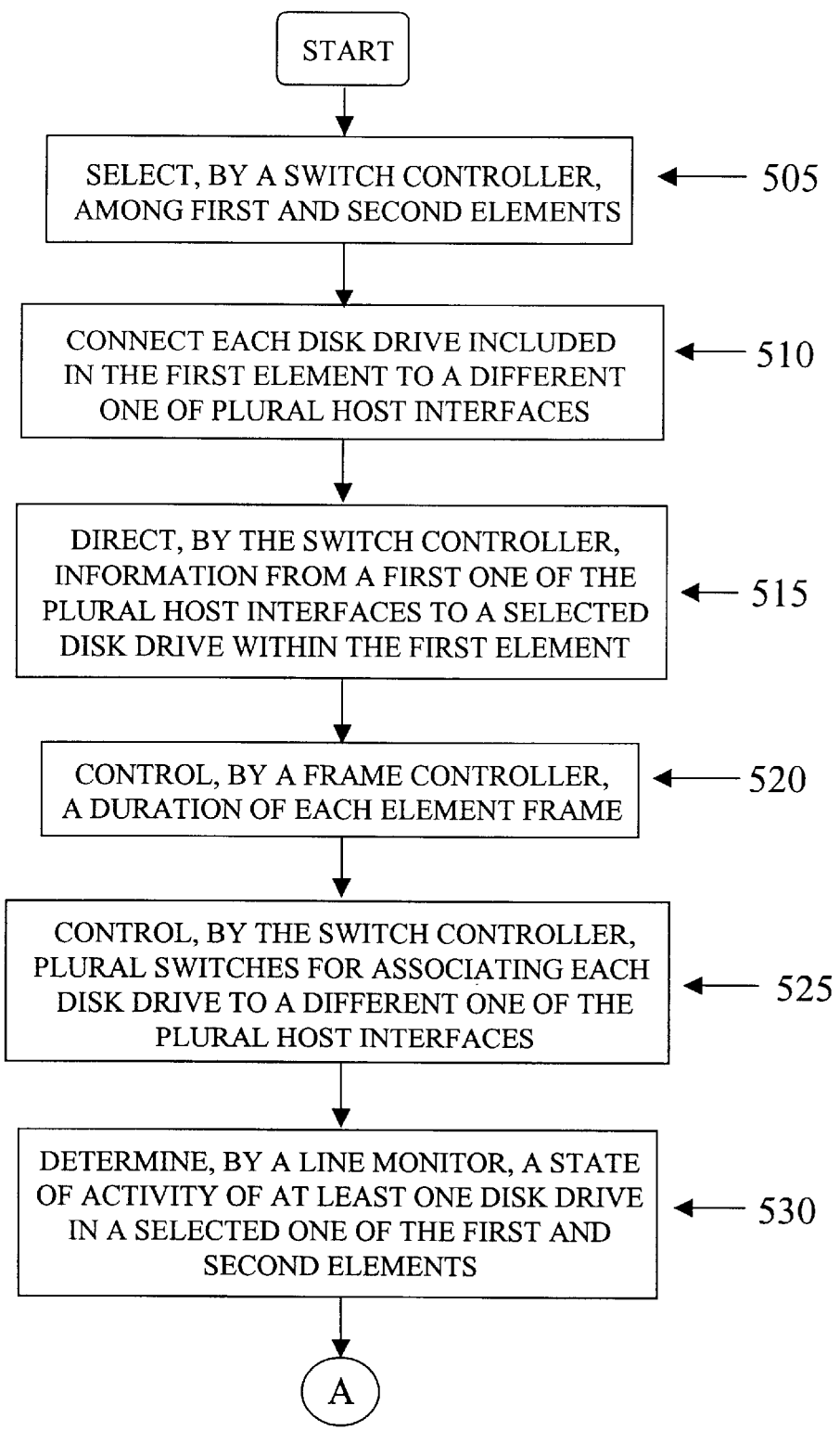
FIGS. 5A and 5B are flowcharts illustrating steps for managing information storage among plural disk drives in accordance with an exemplary embodiment of the present invention.

FIG. 5A is a flowchart illustrating steps for managing information storage among plural disk drives in accordance with an exemplary embodiment of the present invention. In step 505, a switch controller selects among first and second elements, although the switch controller can select among any number of elements. Each of the first and second elements comprises a set of disk drives for storing information. Elements can include any number of disk drives. According to exemplary embodiments, each disk drive contained in the first and second elements is a SATA disk drive or SAS disk drive, although each disk drive can be any type of disk drive or storage system.

According to exemplary embodiments, at least one of the first and second elements is a member of a RAID (redundant array of inexpensive disks, also known as redundant array of independent disks) set. According to exemplary embodiments, the disk drives of any one or combination of elements can be configured as, for example, a RAID set or any other type of disk array system that provides fault tolerance and improved performance.

Each of the first and second elements is associated with an element frame. According to exemplary embodiments, each element frame is included in a master frame that contains multiple frame types. The master frame types are at least one of an element frame, a control frame, a broadcast frame, a poll frame, a copy frame, a mirror frame or any other type of frame that can be used to manage information storage. A master frame can include any combination of frames (including repetition of particular frames), of any type, in any number, in any order or sequence, and of any duration (less than the total duration of the master frame).

For example, a control frame connects at least one of the plural host interfaces to the switch controller to determine a status. The control frame can identify at least one of a sequence and a maximum duration of each frame in the master frame, although the control frame can identify any durational measure of each frame (e.g., actual duration, minimum duration, average duration, etc.). For example, a poll frame is a frame during which any number of disk drives communicates with any type of host controller over the plural host interfaces. A copy frame is a frame during which information can be copied from one disk drive to one or more other disk drives. A mirror frame is a frame during which information received over one of the plural host interfaces is directed by the switch controller to two or more disk drives simultaneously.

A broadcast frame is a frame during which any type of host controller can communicate with all disk drives using one or more of the plural host interfaces. Alternatively, a broadcast frame is a frame during which any one disk drive can communicate with any number of other disk drives. For example, for a host controller to communicate with the disk drives on one or more of the plural host interfaces during the broadcast frame, each disk drive can be connected to its respective host interface through its respective switch. Thus, all disk drives of all elements on the same host interface can receive information from a host controller during a broadcast frame.

Figure 6:
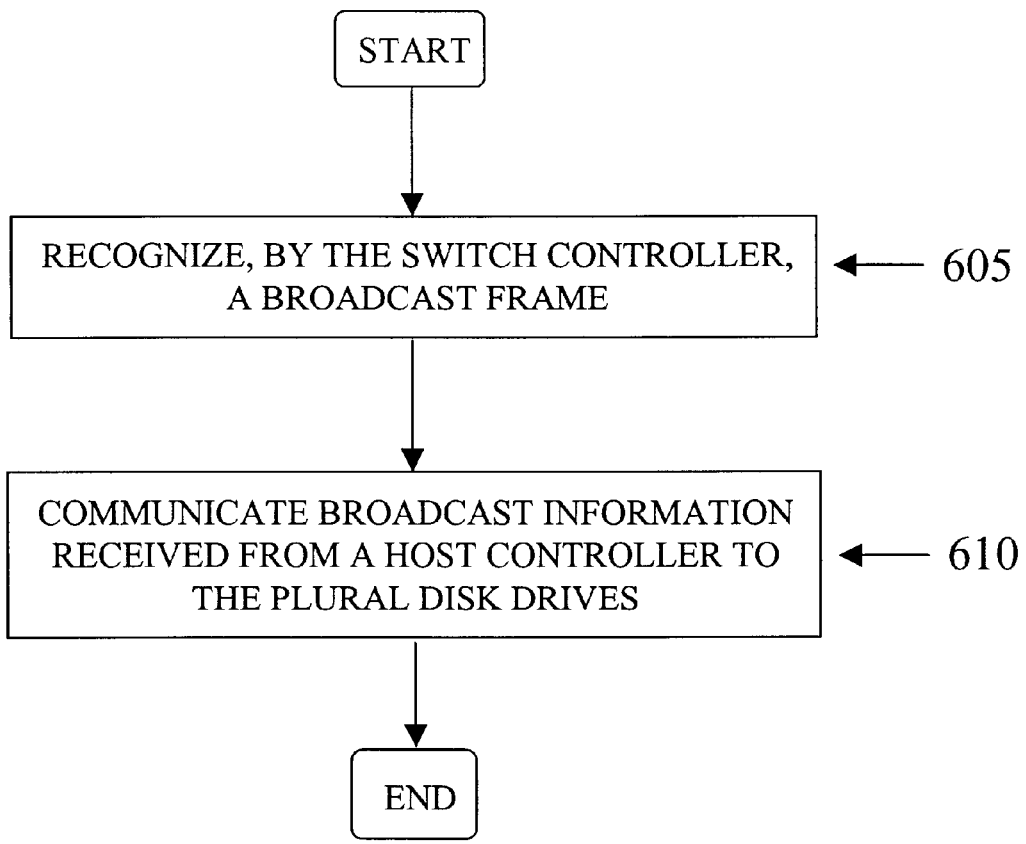
FIG. 6 is a flowchart illustrating steps for processing a broadcast frame by a switch controller in accordance with an exemplary embodiment of the present invention.

The host controller can communicate with any number of disk drives using any combination of plural host interfaces. FIG. 6 is a flowchart illustrating steps for processing a broadcast frame by a switch controller in accordance with an exemplary embodiment of the present invention. In step 605, the switch controller recognizes the broadcast frame. According to exemplary embodiments, the host controller notifies the switch controller that a broadcast frame is to begin. For example, the host controller can issue any type of signal sequence, such as, for example, an interrupt, to the switch controller at the start of a broadcast frame that indicates to the switch controller that a broadcast frame is to begin. The signal sequence can indicate the host interfaces over which the host controller is to communicate. In step 610, the broadcast information received by the switch controller is communicated from the host controller to the plural disk drives. Thus, upon receipt of the signal sequence from the host controller, the switch controller can enable the disk drives on the designated host interfaces and direct the information from the host controller to those enabled disk drives during the broadcast frame.

In step 510 of FIG. 5A, each disk drive included in the first element is connected to a different one of plural host interfaces during the element frame of the first element. Each of plural host interfaces can be any serial disk drive host interface that can be used for accessing disk drives. The switch controller is configurable by at least one of the plural host interfaces. According to exemplary embodiments, a scan controller associates each disk drive of the plural disk drives to one of the plural host interfaces. The scan controller can be connected to each switch that is connected to each of the plural disk drives. Scan controller can be connected to each switch using any type of connection that is capable of transmitting and receiving information.

In step 515, the switch controller directs information from a first one of the plural host interfaces to a selected disk drive within the first element, although the switch controller can direct information from any of the plural host interfaces to any disk drive in any element.

In step 520, a frame controller controls a duration of each frame (e.g., an element frame or any other type of frame) included in the master frame. The frame controller also controls a maximum duration of each frame in the master frame, although the frame controller can control any durational measure of any frame in the master frame (e.g., actual duration, minimum duration, average duration, etc.). The duration of each frame in the master frame can be, for example, pre-assigned or changed dynamically. Consequently, the frame controller can change the duration of any frame or frames in the master frame.

In step 525, the switch controller controls plural switches for associating each disk drive to a different one of the plural host interfaces. According to exemplary embodiments, each of the plural disk drives includes a switch to connect each disk drive to its associated one of the plural host interfaces. Each of the switches can be any type of switch capable of satisfying the requirements of each serial interface, in which the serial interfaces can have the same or different requirements.

In step 530, a line monitor determines a state of activity of at leastone disk drive in a selected one of the first and second elements. According to exemplary embodiments, the line monitor can determine whether or not the disk drives in an element are quiescent or otherwise idle. For example, the line monitor can be a disturbance or idle detector or any other form of circuit for detecting the existence of activity on a connection. For example, the line monitor can be connected to each of the plural switches in each of the elements using any type of connection that is capable of transmitting and receiving information. According to exemplary embodiments, once a disk drive of an element is connected to its respective host interface using its respective switch, if there is any activity between the disk drive and its respective host interface, the disturbance detector of line monitor can detect the presence of activity.

Figure 5B:
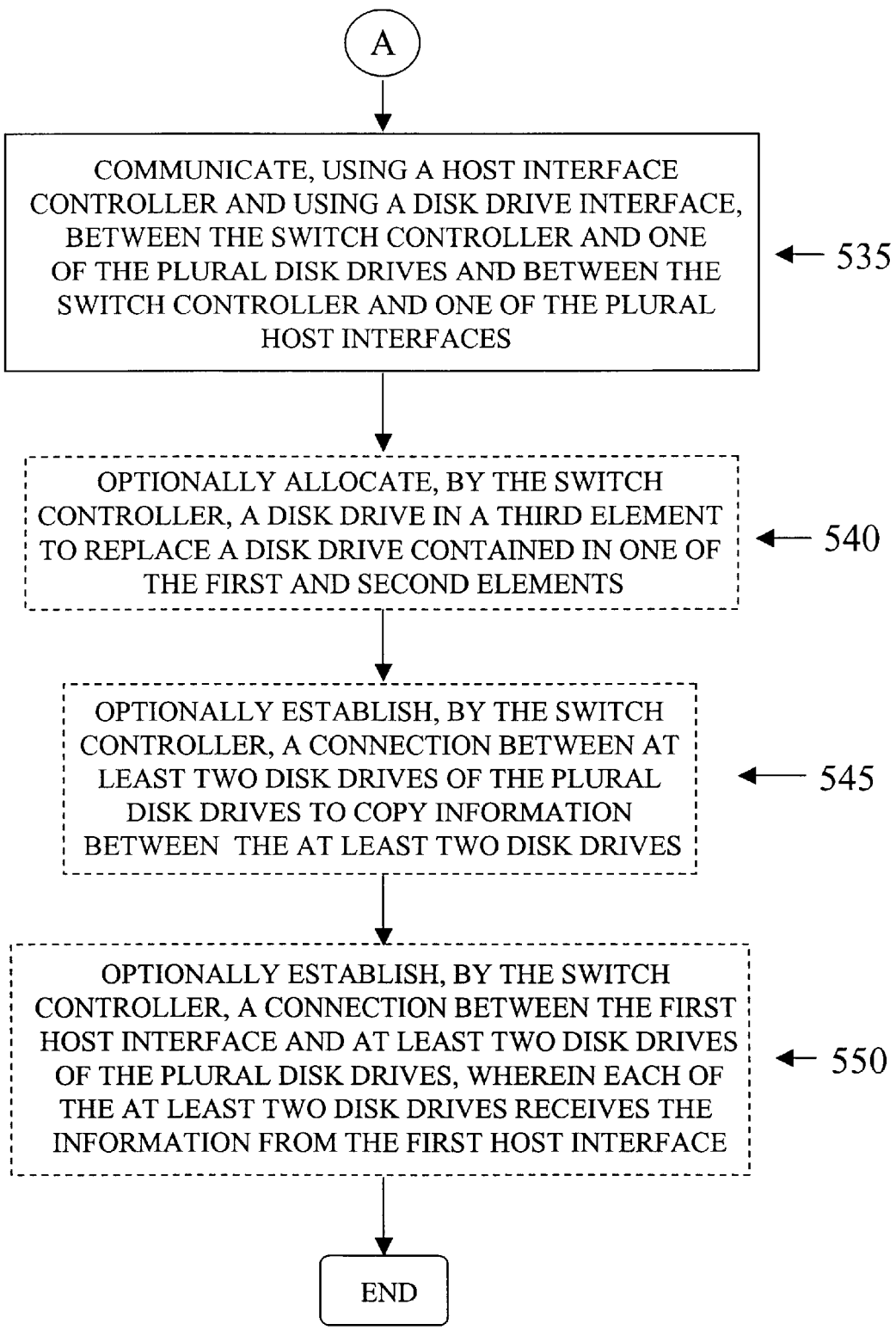

In step 535 of FIG. 5B, a host interface controller, using a disk drive interface, communicates between the switch controller and one of the plural disk drives and between the switch controller and one of the plural host interfaces. For example, the host interface controller can be any type of device that can receive and transmit information using any host interface protocol for accessing and controlling disk drives. According to exemplary embodiments, communication is performed by host interface controller using a disk drive interface. For example, the disk drive interface can be at least one of a SATA interface and a SAS interface. However, the disk drive interface of the host interface controller for communicating information (e.g., commands and data) through host interface controller can be any interface that can be used for accessing and controlling disk drives.

In step 540, the switch controller optionally allocates a disk drive in a third element to replace a disk drive contained in one of the first and second elements. The third element comprises plural disk drives for storing information. The third element can act as a "spares" element for replacing any disk drive that fails in any element. However, any number of spares elements can be used, with each spares element having any number of disk drives. Thus, the disk drives of the spares element can be switched into any element at any time by the switch controller. However, the switch controller can replace any disk drive in any element using any disk drive from any other element. Such redundancy provides for uninterrupted operation in case of failure of one or more of the disk drives of an element.

In step 545, the switch controller optionally establishes a connection between at least two disk drives of the plural disk drives to copy information between the at least two disk drives. The information can be copied between the at least two disk drives during a copy frame. For example, during a copy frame, the switch controller can connect any disk drive of any element (i.e., the source disk drive) to any number of other disk drives in any other elements (i.e., the destination disk drives). Once the disk drives are connected during the copy frame, the switch controller can send a signal sequence to the source and destination disk drives to initiate the transfer of information from the source to the destination disk drive(s). The signal sequence can be any type of signal sequence that is capable of initiating the copying of information, such as, for example, an interrupt, a unique copy-to-copy command, or any other type of signal sequence.

Once initiated during the copy frame, the copying of information can be carried out autonomously between the source and destination disk drives during the copy frame or while other frames are being processed. Once the copying is completed, either the source or destination disk drives can send a signal sequence, for example, an interrupt, to the switch controller to indicate that the copying is completed.

In step 550, a connection is optionally established by the switch controller between the first host interface and at least two disk drives of the plural disk drives. Each of the at least two disk drives receives the information from the first host interface. The mirroring of data to two or more disk drives can occur during a copy frame or a mirror frame. For data mirroring, the switch controller can switch in or otherwise allocate at least two disk drives (i.e., the slaves) to one of the plural host interfaces (i.e., the master). Thus, all information communicated from the one of the plural host interfaces is written to each of the at least two disk drives allocated to the one of the plural host interfaces. Data mirroring according to exemplary embodiments of the present invention can also be performed between a source disk drive and at least two destination disk drives using the sane or similar mechanism.

Figure 7:
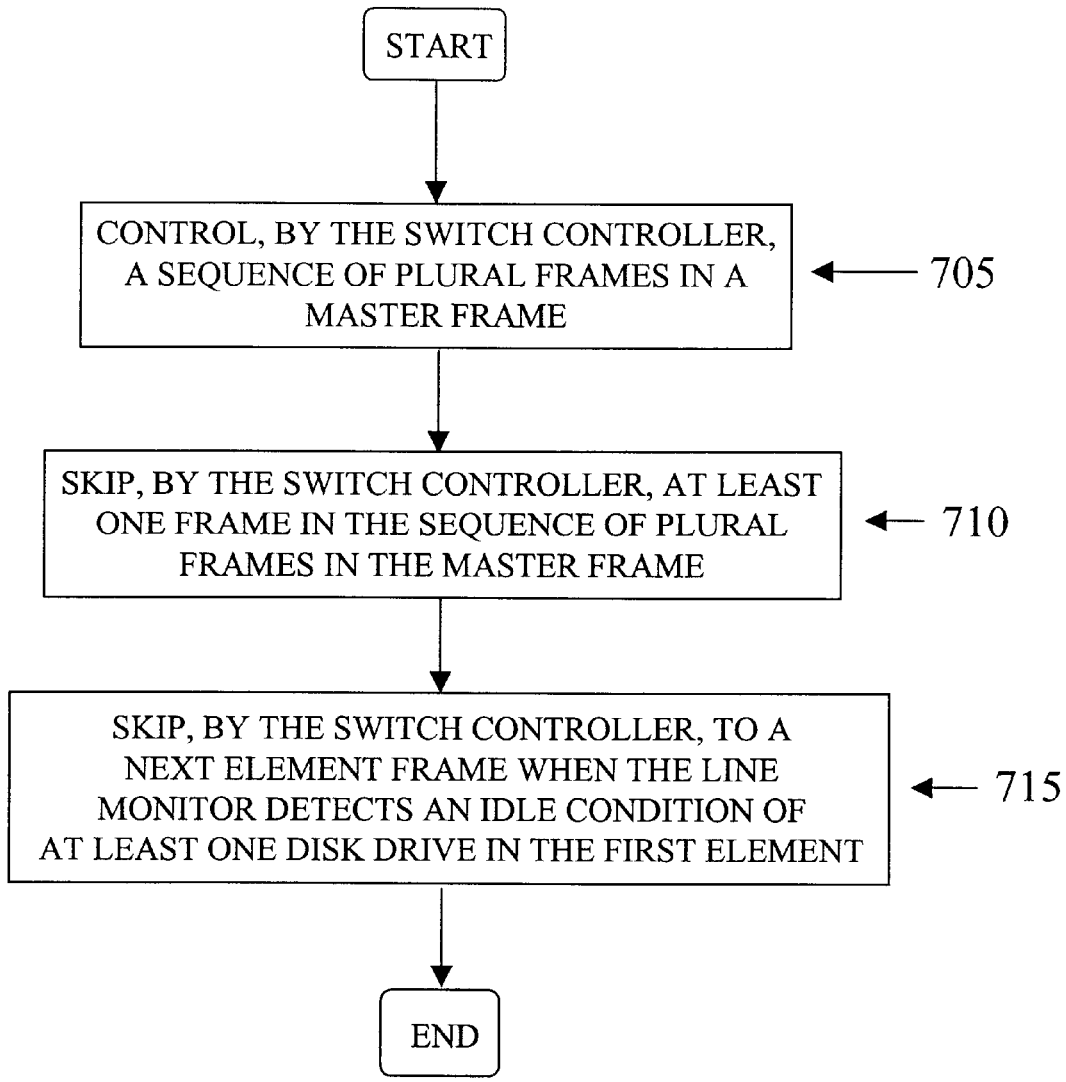
FIG. 7 is a flowchart illustrating steps for controlling frame sequence and frame skipping by a switch controller in accordance with an exemplary embodiment of the present invention.

FIG. 7 is a flowchart illustrating steps for controlling frame sequence and frame skipping by a switch controller in accordance with an exemplary embodiment of the present invention. In step 705, a sequence of plural frames in a master frame is controlled by the switch controller. The frames in a master frame can be ordered in any sequence and instantiated any number of times. For example, a particular frame can be instantiated multiple times in a master frame if there is a substantial amount of activity occurring during that particular frame and additional processing is required to complete the designated activity, function or process.

In step 710, at least one frame is skipped by the switch controller in the sequence of plural frames in the master frame. The line monitor can be used by the switch controller to skip frames in the master frame. In step 715, the switch controller skips to a next element frame when the line monitor detects an idle condition of at least one disk drive in the first element. However, the switch controller can skip any element frame associated with any element when at least one disk drive in the element is idle.

According to exemplary embodiments, the frame controller responds to the line monitor for detecting an idle condition of at least one disk drive in the first element for skipping to a next element frame. In such an exemplary embodiment, the line monitor scans or otherwise monitors the disk drives in an element. For example, if the next frame in the master frame is an element frame, then before transitioning to the next (element) frame in the master frame, the line monitor can monitor the next (element) frame in the master frame to determine if the disk drives in that element are idle. If the line monitor detects that, for example, at least one disk drive in a the next element is idle, the line monitor can provide an interrupt or other signal sequence to the switch controller to notify the switch controller that the disk drives in the element are idle. Thereafter, the switch controller can use the frame controller to skip over the element frame to another frame in the master frame.

According to an alternate exemplary embodiment, all frames in the master frame can be monitored or otherwise processed in parallel to determine, for example, which frames in the master frame can be skipped by the frame controller. In such an alternate exemplary embodiment, the line monitor can scan or otherwise monitor the disk drives in all elements to determine which disk drives in which elements are idle. If the line monitor detects that, for example, at least one disk drive in one or more elements is idle, the line monitor can provide an interrupt or other signal sequence to the switch controller to inform the switch controller that the disk drives in those elements are idle. Thereafter, the switch controller can instruct the scan controller to command the frame controller to skip over the element frames associated with those idle elements to another frame in the master frame. By monitoring all frames in the master frame in parallel, the frame controller can skip over any number, combination, or sequence of frames in the master frame.

The idle monitor can be used by switch controller to force idle the disk drives in an element to transition the element frame to another frame in the master frame without loss of information (e.g., data, commands). During an element frame, the switch controller can command the line monitor to issue a signal sequence to the disk drives in an element during an element frame. The signal sequence commands the disk drives in the element to discontinue use of their associated host interfaces. The signal sequence can be, for example, an interrupt or any form of signal sequence for commanding a disk drive to stop communicating over its respective host interface, for example, a SATA data transfer disconnect. As the disk drives in an element go idle, the idle monitor can detect the idle condition of at leastone disk drive in the element. Once all or any subset of the disk drives in an element are idle, the line monitor can provide an interrupt or other signal sequence to the switch controller to inform the switch controller that the at least one disk drive in the element is idle. Thereafter, the switch controller can use the frame controller to skip to another frame in the master frame.

According to exemplary embodiments, as the disk drives in the element are forced idle, if the next frame in the master frame is an element frame, the idle monitor can detect an idle condition of at least one disk drive in next element frame. As discussed previously, if at least one disk drive in the next element frame is idle, the idle monitor can notify the switch controller of this condition. Consequently, once the at least one disk drive in the current element frame has become idle, the switch controller can skip the next element frame to another frame in the master frame. The switch controller can skip any number of element frames in the master frame using such a mechanism. Alternatively, the switch controller can use the notification from the line monitor to instruct the frame controller to alter or otherwise modify the duration of an element frame, for example, to either shorten or lengthen the duration of an element frame depending on the utilization of the disk drives enabled during an element frame.

Figure 8:
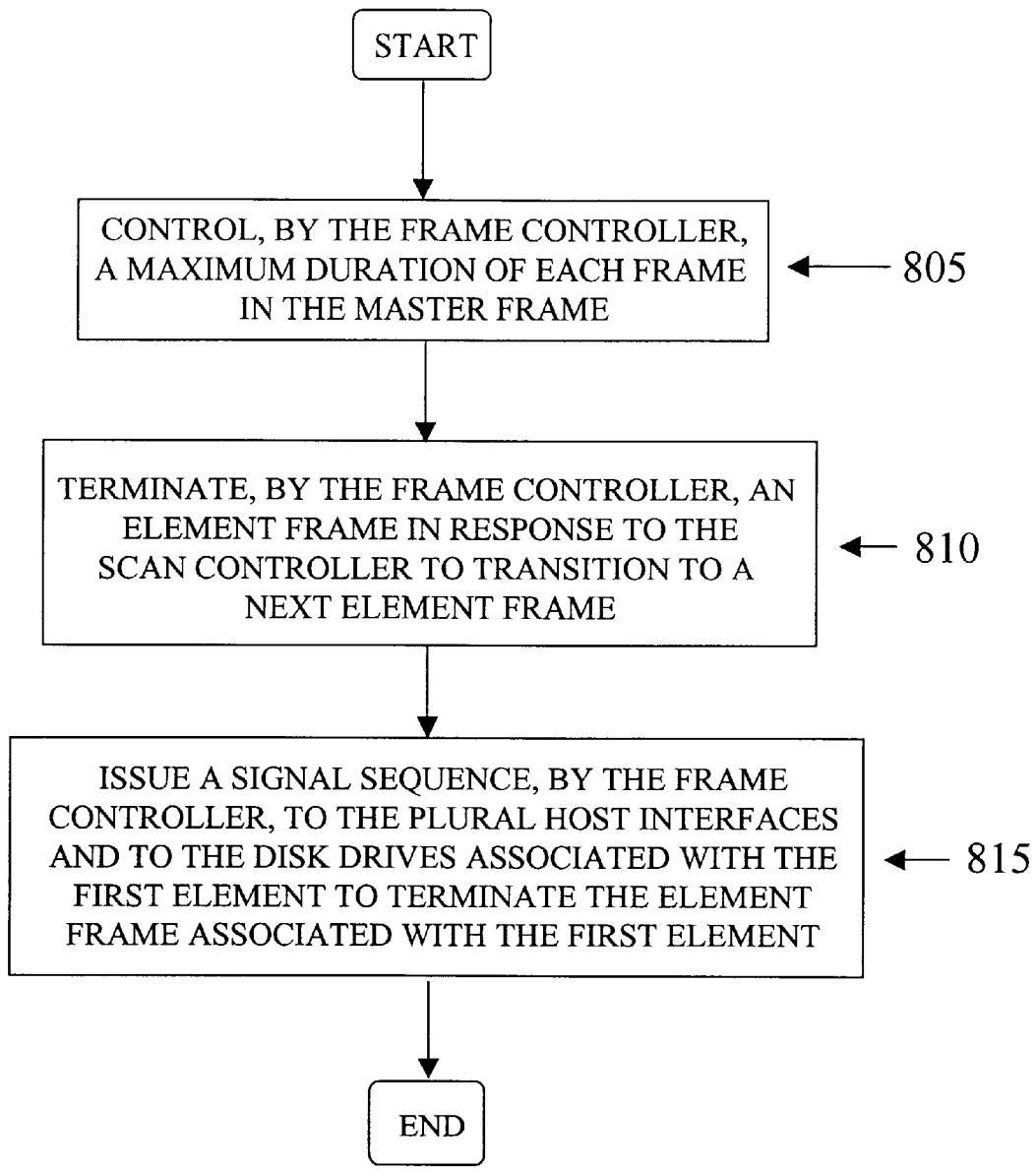
FIG. 8 is a flowchart illustrating steps for controlling frame duration and frame termination by a frame controller in accordance with an exemplary embodiment of the present invention.

FIG. 8 is a flowchart illustrating steps for controlling frame duration and frame termination by a frame controller in accordance with an exemplary embodiment of the present invention. In step 805, a maximum duration of each frame in the master frame is controlled by the frame controller. However, the frame controller can control any measure of the duration of any frame in the master frame (e.g., actual duration, minimum duration, average duration, etc.). For example, if a particular frame is underutilized, the frame controller can assign a shorter frame duration to that particular frame. Alternatively, if a particular frame is over-utilized (e.g., the disk drives in an element are requesting above-average amounts of service during an element frame), the frame controller can assign a longer duration to that particular frame. The duration of each frame in the master frame can be, for example, pre-assigned or dynamically changed. Consequently, the frame controller can change the duration of any frame or frames in the master frame.

In step 810, an element frame is terminated by the frame controller in response to the scan controller to transition to a next element frame. According to exemplary embodiments, the scan controller is connected to each frame controller using any type of connection that is capable of transmitting and receiving information. According to an exemplary embodiment, the end of a frame occurs when the end of a predetermined or dynamically-determined time duration of the frame is reached. For example, to transition out of an element frame in a master frame, the switch controller establishes an end of the element frame by using the frame controllers to de-allocate, disable, or otherwise disconnect the corresponding switches on the plural host interfaces to which the disk drives in the element are connected.

In step 815, a signal sequence is issued by the switch controller, through the frame controller, to the plural host interfaces and to the disk drives associated with the first element to terminate the element frame associated with the first element. The signal sequence can be an interrupt, a command, or any other type of signal sequence that notifies the plural host interfaces and notifies the disk drives associated with the first element to cease, suspend or otherwise interrupt their current action, process, or function so that the element frame can be terminated. Once ceased, suspended, or otherwise interrupted, the frame controller can terminate the element frame. Once an element frame is terminated, during the inter-frame transition, one or more host controllers connected to the plural host interfaces can query the switch controller to determine, for example, the status of the disk drives in the next element frame.

According to exemplary embodiments, configuration information is stored in one of the first and second elements. The configuration information is used to configure at least one of the switch controller and the frame controller. However, "configuration information" can be any type of information that can be used to configure or control any part or component used to manage information storage among plural disk drives in accordance with exemplary embodiments of the present invention. The configuration information can be downloaded or otherwise retrieved by a host controller or the switch controller to configure or otherwise program the switch controller to manage the information storage of the plural disk drives. Once programmed, the switch controller can then access and control all disk drives in all elements.

According to exemplary embodiments, the information directed between the selected disk drive within the first element and the first host interface includes a tag for communicating information. The tag uniquely identifies an element from other elements, so that information can be communicated between a particular element and the host interfaces. The tag can include an identification field for identifying the first element and a command field for command information for the first element. However, the tag can include any type of fields for communicating any type of information.

Thus, the tag can be any type of tag that can be used for differentiating messages between different elements. For example, the tag can be a queue tag, such as that used in the SCSI protocol, the SATA command queue tag used in the SATA protocol, frame information structure field of a frame used in the SATA protocol, the switch resource manager field used in the SATA protocol, the route extension field used in the SATA protocol, or any other type of tag. Using tags according to exemplary embodiments of the present invention allows information to be communicated between the disk drives of any number of elements and their respective host interfaces, while maintaining a designation of the element associated with the information so that the information is routed correctly.

According to exemplary embodiments, each of the plural disk drives can be a set of disk drives, in which each set of disk drives includes a switch controller and a frame controller. In addition, for example, each set of disk drives can include at least one of a scan controller, a line monitor, and a host interface controller. The functions and mechanisms of the individual components (e.g., switch control processor, frame controller, scan controller, line monitor, host interface controller) at each level of sub-element are the same as that described previously. Such a replication of functionality at the sub-element level allows each sub-element to be controlled as its own array of disks, using the same command and control procedures described previously. The replication of the structure of system 100 for each disk drive in each element can occur to any desired depth of replication.

According to an exemplary embodiment, the element frame associated with the first element includes plural sub-element frames, in which each sub-element frame is associated with a set of disk drives in the first element. According to this alternate exemplary embodiment, each set of disk drives in the sub-element of an element is associated with a sub-element frame. The sub-element frame has all the characteristics and features of an element frame. The maximum duration of a sub-element frame is less than a maximum duration of the element frame. The frame controller (e.g., sub-frame controller) controls the maximum duration of each sub-element frame in the element frame. The switch controller (e.g., sub-switch controller) controls a sequence of each sub-element frame in the element frame.

However, each element frame in the master frame can be subdivided into any type of sub-frame, such as a sub-element frame, a sub-control frame, a sub-broadcast frame, a sub-poll frame, a sub-copy frame, or any other type of sub-frame. Each type of sub-frame has the same characteristics and features, and is controlled in the same manner, as the corresponding type of (regular) frames discussed previously. Thus, each element frame can act as a sub-master frame that contains multiple sub-frame types. The corresponding element frame can be sub-divided into any desired number of sub-frames (e.g., a sub-element frame divided into sub-sub-element frames, etc.).

The steps of a computer program as illustrated in FIGS. 5A, 5B, 6, 7, and 8 for managing information storage among plural disk drives can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

What is claimed is:

1. A system for managing information storage among plural disk drives, the system comprising:

plural host interfaces;

first and second elements, each comprising a set of disk drives for storing information, wherein each of the first and second elements is associated with an element frame, with each disk drive included in the first element being connected to a different one of the plural host interfaces during the element frame of the first element;

a switch controller, configurable by at least one of the plural host interfaces, for selecting among the first and second elements, and for directing information from a first one of the plural host interfaces to a selected disk drive within the first element; and a frame controller for controlling a duration of each element frame.

2. The system of claim 1, comprising:

plural switches, controlled by the switch controller, for connecting each disk drive to a different one of the plural host interfaces.

3. The system of claim 1, wherein each disk drive contained in the first and second elements is at least one of a SATA (serial advanced technology attachment) disk drive and a SAS (serial attached small computer system interface (SCSI)) disk drive.

4. The system of claim 1, wherein each element frame is included in a master frame that contains multiple frame types.

5. The system of claim 4, wherein the multiple frame types are at least one of an element frame, a control frame, a broadcast frame, a poll frame, and a copy frame.

6. The system of claim 5, wherein the control frame connects at least one of the plural host interfaces to the switch controller to determine a status.

7. The system of claim 5, wherein the switch controller includes means for recognizing the broadcast frame and for communicating broadcast information received from a host controller to the plural disk drives.

8. The system of claim 4, wherein the frame controller controls a maximum duration of each frame in the master frame.

9. The system of claim 1, wherein the switch controller controls a sequence of plural frames in a master frame.

10. The system of claim 9, wherein a control frame identifies at least one of the sequence and a maximum duration of each frame in the master frame.

11. The system of claim 9, wherein the switch controller is configured to skip at least one frame in the sequence of plural frames in the master frame.

12. The system of claim 11, wherein the switch controller is configured to skip an element frame of the master frame when at least one disk drive in the first element is idle.

13. The system of claim 1, wherein the switch controller comprises:
a scan controller for associating each disk drive of the plural disk drives to one of the plural host interfaces.

14. The system of claim 13, wherein the frame controller is responsive to the scan controller for terminating an element frame to transition to a next element frame.

15. The system of claim 14, wherein the frame controller terminates the element frame associated with the first element by issuing a signal sequence to the plural host interfaces and to the disk drives associated with the first element to terminate the element frame associated with the first element.

16. The system of claim 1, wherein the switch controller comprises:
a line monitor for determining a state of activity of at least one disk drive in a selected one of the first and second elements.

17. The system of claim 16, wherein the switch controller is responsive to the line monitor for detecting an idle condition of at least one disk drive in the first element for skipping to a next element frame.

18. The system of claim 1, wherein the switch controller comprises:
a host interface controller for communicating between the switch controller and one of the plural disk drives, and for communicating between the switch controller and one of the plural host interfaces, wherein communication is performed using a disk drive interface.

19. The system of claim 18, wherein the disk drive interface is at least one of a SATA (serial advanced technology attachment) interface and a SAS (serial attached small computer system interface (SCSI)) interface.

20. The system of claim 1, comprising:
a third element, comprising plural disk drives for storing information, wherein the switch controller allocates a disk drive in the third element to replace a disk drive contained in one of the first and second elements.

21. The system of claim 1, wherein configuration information is stored in one of the first and second elements.

22. The system of claim 21, wherein the configuration information is used to configure at least one of the switch controller and the frame controller.

23. The system of claim 1, wherein the information directed between the selected disk drive within the first element and the first host interface includes a tag for communicating information.

24. The system of claim 23, wherein the tag includes an identification field for identifying the first element.

25. The system of claim 23, wherein the tag includes a command field for command information for the first element.

26. The system of claim 1, wherein at least one of the first and second elements is a member of a RAID (redundant array of inexpensive disks) set.

27. The system of claim 1, wherein the switch controller is configured to establish a connection between at least two disk drives of the plural disk drives to copy information between the at least two disk drives.

28. The system of claim 27, wherein information is copied between the at least two disk drives during a copy frame.

29. The system of claim 1, wherein the switch controller is configured to establish a connection between the first host interface and at least two disk drives of the plural disk drives, wherein each of the at least two disk drives receives the information from the first host interface.

30. The system of claim 1, wherein each of the plural disk drives includes a set of disk drives, wherein each set of disk drives includes a switch controller and a frame controller.

31. The system of claim 30, wherein each set of disk drives includes at least one of a scan controller, a line monitor, and a host interface controller.

32. The system of claim 1, wherein the element frame associated with the first element includes plural sub-element frames, wherein each sub-element frame is associated with a set of disk drives in the first element.

33. The system of claim 32, wherein a maximum duration of a sub-element frame is less than a maximum duration of the element frame.

34. The system of claim 32, wherein the frame controller controls a maximum duration of each sub-element frame in the element frame.

35. The system of claim 32, wherein the switch controller controls a sequence of each sub-element frame in the element frame.

36. A system for managing information storage among plural disk drives, comprising:
a switch controller, for selecting among first and second elements, each comprising a set of disk drives for storing information, and for directing information from a first one of plural host interfaces to a selected disk drive within the first element, wherein the switch controller is configurable by at least one of the plural host interfaces, and wherein the switch controller is operable to communicate with the first and second elements using an associated element frame, with each disk drive included in the first element being connected to a different one of the plural host interfaces during the element frame of the first element; and
a frame controller for controlling a duration of each element frame.

37. The system of claim 36, comprising:
plural switches, controlled by the switch controller, for connecting each disk drive to a different one of the plural host interfaces.

38. The system of claim 36, wherein each disk drive contained in the first and second elements is at least one of a SATA (serial advanced technology attachment) disk drive and a SAS (serial attached small computer system interface (SCSI)) disk drive.

39. The system of claim 36, wherein each element frame is included in a master frame that contains multiple frame types.

40. The system of claim 39, wherein the frame controller controls a maximum duration of each frame in the master frame.

41. The system of claim 36, wherein the switch controller controls a sequence of plural frames in a master frame.

42. The system of claim 39, wherein the switch controller is configured to skip at least one frame in a sequence of plural frames in the master frame.

43. The system of claim 36, wherein the switch controller comprises:
a scan controller for associating each disk drive of the plural disk drives to one of the plural host interfaces.

44. The system of claim 36, wherein the switch controller comprises:
a line monitor for determining a state of activity of at least one disk drive in a selected one of the first and second elements.

45. The system of claim 36, wherein the switch controller comprises:
a host interface controller for communicating between the switch controller and one of the plural disk drives, and for communicating between the switch controller and one of the plural host interfaces, wherein communication is performed using a disk drive interface.

46. The system of claim 45, wherein the disk drive interface is at least one of a SATA (serial advanced technology attachment) interface and a SAS (serial attached small computer system interface (SCSI)) interface.

47. The system of claim 36, comprising:
a third element, comprising plural disk drives for storing information, wherein the switch controller allocates a disk drive in the third element to replace a disk drive contained in one of the first and second elements.

48. The system of claim 36, wherein at least one of the first and second elements is a member of a RAID (redundant array of inexpensive disks) set.

49. A method for managing information storage among plural disk drives, comprising the steps of:
selecting, by a switch controller, among first and second elements, each comprising a set of disk drives for storing information, wherein each of the first and second elements is associated with an element frame;
connecting each disk drive included in the first element with a different one of plural host interfaces during the element frame of the first element, wherein the switch controller is configurable by at least one of the plural host interfaces;
directing, by the switch controller, information from a first one of the plural host interfaces to a selected disk drive within the first element; and
controlling, by a frame controller, a duration of each element frame.

50. The method of claim 49, comprising the step of:
controlling, by the switch controller, plural switches for connecting each disk drive to a different one of the plural host interfaces.

51. The method of claim 49, wherein each disk drive contained in the first and second elements is at least one of a SATA (serial advanced technology attachment) disk drive and a SAS (serial attached small computer system interface (SCSI)) disk drive.

52. The method of claim 49, wherein each element frame is included in a master frame that contains multiple frame types.

53. The method of claim 52, wherein the multiple frame types are at least one of an element frame, a control frame, a broadcast frame, a poll frame, and a copy frame.

54. The method of claim 53, wherein the control frame connects at least one of the plural host interfaces to the switch controller to determine a status.

55. The method of claim 53, comprising the step of:
recognizing, by the switch controller, the broadcast frame; and
communicating, by the switch controller, broadcast information received from a host controller to the plural disk drives.

56. The method of claim 52, comprising the step of:
controlling, by the frame controller, a maximum duration of each frame in the master frame.

57. The method of claim 49, comprising the step of:
controlling, by the switch controller, a sequence of plural frames in a master frame.

58. The method of claim 57, wherein a control frame identifies at least one of the sequence and a maximum duration of each frame in the master frame.

59. The method of claim 57, comprising the step of:
skipping, by the switch controller, at least one frame in the sequence of plural frames in the master frame.

60. The method of claim 59, wherein an element frame of the master frame is skipped by the switch controller when at least one disk drive in the first element is idle.

61. The method of claim 49, wherein a scan controller associates each disk drive of the plural disk drives to one of the plural host interfaces.

62. The method of claim 61, comprising the step of:
terminating, by the frame controller, an element frame in response to the scan controller to transition to a next element frame.

63. The method of claim 62, comprising the step of:
issuing a signal sequence, by the frame controller, to the plural host interfaces and to the disk drives associated with the first element to terminate the element frame associated with the first element.

64. The method of claim 49, comprising the step of:
determining, by a line monitor, a state of activity of at least one disk drive in a selected one of the first and second elements.

65. The method of claim 64, comprising the step of:
skipping, by the switch controller, to a next element frame when the line monitor detects an idle condition of at least one disk drive in the first element.

66. The method of claim 49, comprising the steps of:
communicating, using a host interface controller and using a disk drive interface, between the switch controller and one of the plural disk drives and between the switch controller and one of the plural host interfaces.

67. The method of claim 66, wherein the disk drive interface is at least one of a SATA (serial advanced technology attachment) interface and a SAS (serial attached small computer system interface (SCSI)) interface.

68. The method of claim 49, comprising the step of:
allocating, by the switch controller, a disk drive in a third element, comprising plural disk drives for storing information, to replace a disk drive contained in one of the first and second elements.

69. The method of claim 49, wherein configuration information is stored in one of the first and second elements.

70. The method of claim 69, wherein the configuration information is used to configure at least one of the switch controller and the frame controller.

71. The method of claim 49, wherein the information directed between the selected disk drive within the first element and the first host interface includes a tag for communicating information.

72. The method of claim 71, wherein the tag includes an identification field for identifying the first element.

73. The method of claim 71, wherein the tag includes a command field for command information for the first element.

74. The method of claim 49, wherein at least one of the first and second elements is a member of a RAID (redundant array of inexpensive disks) set.

75. The method of claim 49, comprising the step of:

establishing, by the switch controller, a connection between at least two disk drives of the plural disk drives to copy information between the at least two disk drives.

76. The method of claim 75, wherein information is copied between the at least two disk drives during a copy frame.

77. The method of claim 49, comprising the step of:

establishing, by the switch controller, a connection between the first host interface and at least two disk drives of the plural disk drives, wherein each of the at least two disk drives receives the information from the first host interface.

78. The method of claim 49, wherein each of the plural disk drives includes a set of disk drives, wherein each set of disk drives includes a switch controller and a frame controller.

79. The method of claim 78, wherein each set of disk drives includes at least one of a scan controller, a line monitor, and a host interface controller.

80. The method of claim 49, wherein the element frame associated with the first element includes plural sub-element frames, wherein each sub-element frame is associated with a set of disk drives in the first element.

81. The method of claim 80, wherein a maximum duration of a sub-element frame is less than a maximum duration of the element frame.

82. The method of claim 80, wherein the frame controller controls a maximum duration of each sub-element frame in the element frame.

83. The method of claim 80, wherein the switch controller controls a sequence of each sub-element frame in the element frame.

* * * * *